US 11,790,827 B2

United States Patent
Kwon et al.

(10) Patent No.: US 11,790,827 B2
(45) Date of Patent: Oct. 17, 2023

(54) DISPLAY SYSTEM WITH THERMAL SENSOR AND METHOD OF OPERATING THE SAME

(71) Applicant: Samsung Electronics Co., Ltd., Suwon-si (KR)

(72) Inventors: Kyounghwan Kwon, Seoul (KR); Sungchul Yoon, Suwon-si (KR); Jungwook Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/458,629

(22) Filed: Aug. 27, 2021

(65) Prior Publication Data
US 2022/0139294 A1 May 5, 2022

(30) Foreign Application Priority Data

Oct. 30, 2020 (KR) .................. 10-2020-0143477
Feb. 5, 2021 (KR) .................. 10-2021-0016807

(51) Int. Cl.
| | |
|---|---|
| G09G 3/20 | (2006.01) |
| G09G 3/3233 | (2016.01) |
| H04N 5/33 | (2023.01) |
| G01K 3/10 | (2006.01) |
| G01K 13/00 | (2021.01) |

(52) U.S. Cl.
CPC ............ *G09G 3/2096* (2013.01); *G01K 3/10* (2013.01); *G01K 13/00* (2013.01); *G09G 3/3233* (2013.01); *H04N 5/33* (2013.01); *G09G 2300/0842* (2013.01); *G09G 2310/0243* (2013.01);
(Continued)

(58) Field of Classification Search
CPC ......... G09G 2320/04; G09G 2320/041; G09G 2310/08; G09G 2340/0435; G09G 2340/04; G09G 2340/00; G09G 2310/0243; G09G 3/3233; G09G 3/2096
See application file for complete search history.

(56) References Cited

U.S. PATENT DOCUMENTS

| 8,964,298 B2 | 2/2015 | Haddick et al. |
|---|---|---|
| 9,099,047 B2 | 8/2015 | Vasquez et al. |

(Continued)

FOREIGN PATENT DOCUMENTS

| JP | 2005352412 A | 12/2005 |
|---|---|---|
| JP | 5587834 B2 | 9/2014 |
| JP | 2019220741 A | 12/2019 |

*Primary Examiner* — Dennis P Joseph
(74) *Attorney, Agent, or Firm* — Muir Patent Law, PLLC

(57) ABSTRACT

A display system includes a host processor and a display driver integrated circuit. The host processor includes a first thermal sensor. The display driver integrated circuit including a second thermal sensor that is different from the first thermal sensor. The host processor generates a first performance control signal indicating whether to increase or decrease performance of a display panel from first temperature information that is obtained from the first thermal sensor and second temperature information that is obtained from the second thermal sensor, and to output the first performance control signal. The display driver integrated circuit receives the first performance control signal from the host processor, and controls the display panel based on the first performance control signal to adjust the performance of the display panel.

14 Claims, 27 Drawing Sheets

(52) U.S. Cl.
 CPC ... *G09G 2310/08* (2013.01); *G09G 2320/041* (2013.01); *G09G 2340/0435* (2013.01)

(56) References Cited

U.S. PATENT DOCUMENTS

| | | |
|---|---|---|
| 9,898,797 B2 | 2/2018 | Hsiao et al. |
| 10,290,324 B2 | 5/2019 | Lai et al. |
| 2016/0290873 A1* | 10/2016 | Horng ..................... G01K 1/16 |
| 2016/0328821 A1* | 11/2016 | Hsiao ................... H04N 7/0127 |
| 2018/0090102 A1* | 3/2018 | Chappalli .............. G09G 5/003 |
| 2018/0181171 A1* | 6/2018 | Jang ..................... H02J 7/0091 |

* cited by examiner

FIG. 3A

| CURRENT TEMPERATURE | DISPLAY PERFORMANCE | DURATION |
|---|---|---|
| TEMP_H_1 | PERF_D_1 | DUR_1_1_1 |
| | PERF_D_2 | DUR_1_1_2 |
| | ⋮ | ⋮ |
| | PERF_D_M | DUR_1_1_M |
| TEMP_H_2 | PERF_D_1 | DUR_1_2_1 |
| | PERF_D_2 | DUR_1_2_2 |
| | ⋮ | ⋮ |
| | PERF_D_M | DUR_1_2_M |
| ⋮ | ⋮ | ⋮ |
| TEMP_H_K | PERF_D_1 | DUR_1_K_1 |
| | PERF_D_2 | DUR_1_K_2 |
| | ⋮ | ⋮ |
| | PERF_D_M | DUR_1_K_M |

| CURRENT TEMPERATURE | DISPLAY PERFORMANCE | DURATION |
|---|---|---|
| TEMP_D_1 | PERF_D_1 | DUR_2_1_1 |
| | PERF_D_2 | DUR_2_1_2 |
| | ⋮ | ⋮ |
| | PERF_D_M | DUR_2_1_M |
| TEMP_D_2 | PERF_D_1 | DUR_2_2_1 |
| | PERF_D_2 | DUR_2_2_2 |
| | ⋮ | ⋮ |
| | PERF_D_M | DUR_2_2_M |
| ⋮ | ⋮ | ⋮ |
| TEMP_D_K | PERF_D_1 | DUR_2_K_1 |
| | PERF_D_2 | DUR_2_K_2 |
| | ⋮ | ⋮ |
| | PERF_D_M | DUR_2_K_M |

| CURRENT TEMPERATURE | IMAGE SENSOR PERFORMANCE | DURATION |
|---|---|---|
| TEMP_C_1 | PERF_C_1 | DUR_6_1_1 |
| | PERF_C_2 | DUR_6_1_2 |
| | ⋮ | ⋮ |
| | PERF_C_M | DUR_6_1_M |
| TEMP_C_2 | PERF_C_1 | DUR_6_2_1 |
| | PERF_C_2 | DUR_6_2_2 |
| | ⋮ | ⋮ |
| | PERF_C_M | DUR_6_2_M |
| ⋮ | ⋮ | ⋮ |
| TEMP_C_K | PERF_C_1 | DUR_6_K_1 |
| | PERF_C_2 | DUR_6_K_2 |
| | ⋮ | ⋮ |
| | PERF_C_M | DUR_6_K_M |

LT6

DISPLAY SYSTEM WITH THERMAL SENSOR AND METHOD OF OPERATING THE SAME

CROSS-REFERENCE TO RELATED APPLICATION

This application claims priority under 35 USC § 119 to Korean Patent Application No. 10-2020-0143477 filed on Oct. 30, 2020 and to Korean Patent Application No. 10-2021-0016807 filed on Feb. 5, 2021 in the Korean Intellectual Property Office (KIPO), the contents of which are herein incorporated by reference in their entirety.

BACKGROUND

1. Technical Field

Example embodiments relate to semiconductor integrated circuits, and more particularly to display systems that operate using thermal sensors, and methods of operating the display systems.

2. Description of the Related Art

As information technology is developed, a display device becomes important to provide information to a user. Various display devices such as liquid crystal displays (LCDs), plasma displays, and electroluminescent displays have gained popularity. Among these display devices, electroluminescent displays have fast response speeds and reduced power consumption, using light-emitting diodes (LEDs) or organic light-emitting diodes (OLEDs) that emit light through recombination of electrons and holes. Recently, as the performance of display devices and display systems including the display devices is improved, a greater amount of heat may be emitted within the display systems, and thus various methods for controlling and/or managing the heat in the display systems have been researched.

SUMMARY

At least one example embodiment of the present disclosure provides a display system capable of efficiently controlling performance using a thermal sensor.

At least one example embodiment of the present disclosure provides a method of operating the display system.

According to example embodiments, a display system includes a host processor and a display driver integrated circuit. The host processor includes a first thermal sensor. The display driver integrated circuit including a second thermal sensor that is different from the first thermal sensor. The host processor generates a first performance control signal indicating whether to increase or decrease performance of a display panel from first temperature information that is obtained from the first thermal sensor and second temperature information that is obtained from the second thermal sensor, and to output the first performance control signal. The display driver integrated circuit receives the first performance control signal from the host processor, and controls the display panel based on the first performance control signal to adjust the performance of the display panel.

According to example embodiments, in a method of operating a display system, first temperature information is obtained, by a host processor, from a first thermal sensor that is included in the host processor. Second temperature information is received, by the host processor, from a display driver integrated circuit. The second temperature information is obtained from a second thermal sensor that is different from the first thermal sensor, is located outside the host processor, and is included in the display driver integrated circuit. A first performance control signal indicating whether to increase or decrease performance of a display panel is generated by the host processor from the first temperature information and the second temperature information and is output. The first performance control signal is received, by the display driver integrated circuit, from the host processor. The display panel is controlled, by the display driver integrated circuit, based on the first performance control signal to adjust the performance of the display panel.

According to example embodiments, a display system includes a host processor, a display device, and an image sensor. The host processor includes a first thermal sensor that generates first temperature information, and generates a first performance control signal indicating whether to increase or decrease performance of a display panel from the first temperature information, second temperature information and third temperature information. The display device is controlled by the host processor, and includes the display panel and a display driver integrated circuit. The display driver integrated circuit includes a second thermal sensor that generates the second temperature information, and controls the display panel based on the first performance control signal to adjust the performance of the display panel. The image sensor is controlled by the host processor, and includes a pixel array and an image sensor driver integrated circuit. The image sensor driver integrated circuit includes a third thermal sensor configured to generate the third temperature information. The host processor determines, based on the first temperature information and a first look-up table, a first duration for which the display device maintains a first performance, determines, based on the second temperature information and a second look-up table, a second duration for which the display device maintains the first performance, determines, based on the third temperature information and a third look-up table, a third duration for which the display device maintains the first performance, selects a shortest one from among the first duration, the second duration and the third duration, and sets the first performance control signal such that the display device operates with the first performance for the selected one from among the first duration, the second duration and the third duration.

In the display system and the method of operating the display system according to example embodiments, the performance of the display device and/or the image sensor may be controlled based on not only the temperature information that is obtained from the thermal sensor inside the host processor but also the temperature information that is obtained from the thermal sensor outside the host processor. For example, a feedback operation (e.g., the throttling operation) may be performed to reduce the amount of heat emitted from the display device and/or the image sensor, and a feedforward operation may also be performed to check in advance how long the display device and/or the image sensor can normally operate when the performance of the display device and/or the image sensor is to be boosted and to drive the display system based on a result of checking. Accordingly, the performance of the display system may be adaptively and/or efficiently controlled, and may be instantaneously (or momentarily) maximized by the feedforward operation.

BRIEF DESCRIPTION OF THE DRAWINGS

Illustrative, non-limiting example embodiments will be more clearly understood from the following detailed description taken in conjunction with the accompanying drawings.

FIGS. 3A, 3B, 4A, 4B, 5A and 5B are diagrams for describing an operation of a display system of FIG. 2.

FIGS. 15A, 15B and 15C are diagrams for describing an operation of a display system of FIG. 14.

DETAILED DESCRIPTION OF THE EMBODIMENTS

Figure 1:
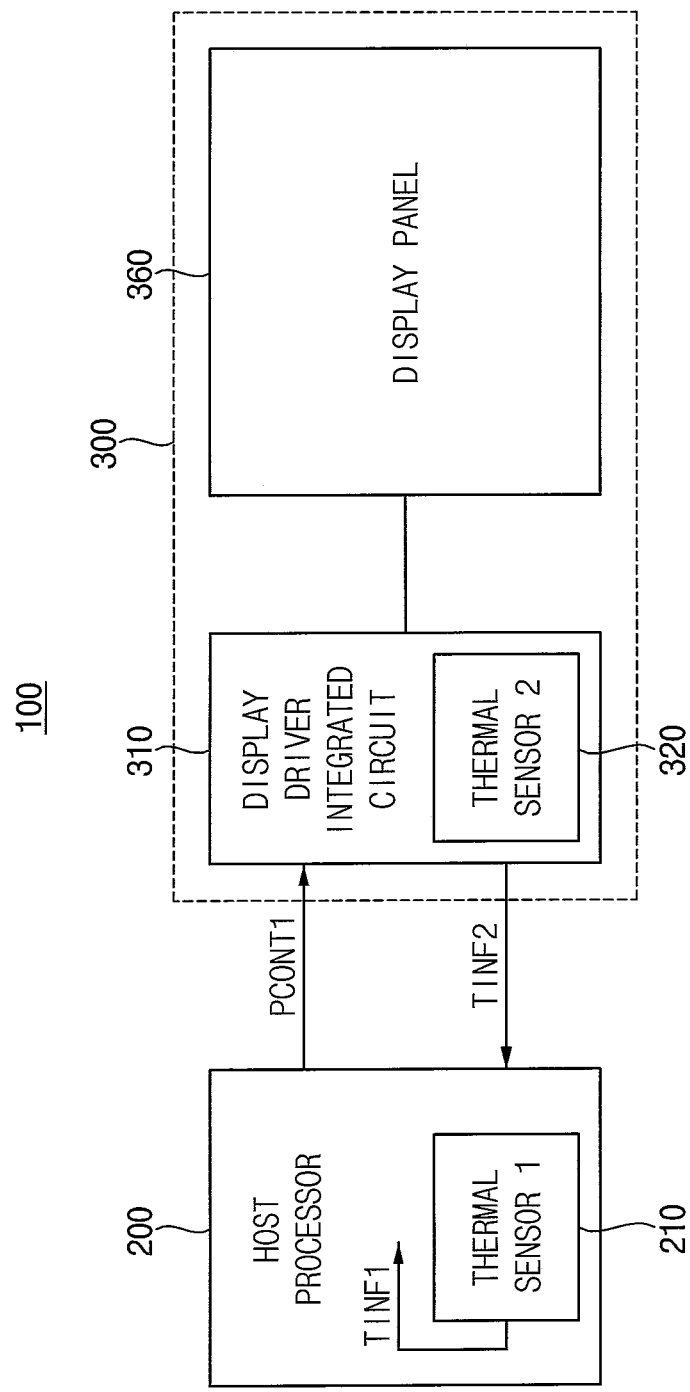
FIG. 1 is a block diagram illustrating a display system according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a block diagram illustrating a display system according to example embodiments.

Referring to FIG. 1, a display system 100 includes a host processor 200 and a display device 300. The display device 300 includes a display driver integrated (DDI) circuit 310 and a display panel 360.

The host processor 200 controls overall operations of the display system 100, and includes a first thermal sensor 210. The first thermal sensor 210 generates first temperature information TINF1. The first temperature information TINF1 may represent a current (or present) temperature and/or an operating temperature inside the host processor 200. A thermal sensor may be referred to as a temperature sensor.

In some example embodiments, the host processor 200 may be implemented in the form of an application processor (AP) or a system-on-chip (SoC). In some embodiments, the first thermal sensor 210 may be integrated on a semiconductor substrate with transistors within the host processor 200.

The display driver integrated circuit 310 controls an operation of the display device 300, and includes a second thermal sensor 320 that is different from the first thermal sensor 210. In some embodiments, the second thermal sensor 320 may be integrated on a semiconductor substrate with transistors within the display driver integrated circuit 310. The second thermal sensor 320 generates second temperature information TINF2. The second temperature information TINF2 may represent a current temperature and/or an operating temperature inside the display driver integrated circuit 310.

The display panel 360 may perform an image display operation (e.g., may display a frame image) based on or under a control of the display driver integrated circuit 310.

The host processor 200 generates a first performance control signal PCONT1 based on the first temperature information TINF1 and the second temperature information TINF2, and outputs the first performance control signal PCONT1. The first performance control signal PCONT1 is used to increase or decrease performance of the display panel 360. The first temperature information TINF1 is internally obtained from the first thermal sensor 210 that is located inside the host processor 200. The second temperature information TINF2 is externally obtained from the second thermal sensor 320 that is located outside the host processor 200, and is received from the display driver integrated circuit 310. The display driver integrated circuit 310 receives the first performance control signal PCONT1 from the host processor 200, and controls the display panel 360 based on the first performance control signal PCONT1 such that the performance of the display panel 360 increases or decreases.

Detailed configurations and operations of the host processor 200 and the display driver integrated circuit 310 will be described with reference to FIGS. 2 through 7.

In some example embodiments, as will be described with reference to FIGS. 4A and 4B, the host processor 200 may set the first performance control signal PCONT1 based on the first temperature information TINF1 and the second temperature information TINF2 such that a boosting operation is performed for increasing the performance of the display panel 360 based on the first performance control signal PCONT1. In other example embodiments, as will be described with reference to FIGS. 5A and 5B, the host processor 200 may set the first performance control signal PCONT1 based on the first temperature information TINF1 and the second temperature information TINF2 such that a throttling operation is performed for decreasing the performance of the display panel 360 based on the first performance control signal PCONT1.

In some example embodiments, as will be described with reference to FIGS. 4A, 4B, 5A and 5B, the performance of the display panel 360 may include at least one of a frame rate (or refresh rate) of the display panel 360 and a resolution of the display panel 360. The frame rate may correspond to the number of frame images displayed on the display panel 360 during a unit interval. However, the performance of the display panel 360 is not limited thereto.

Figure 2:
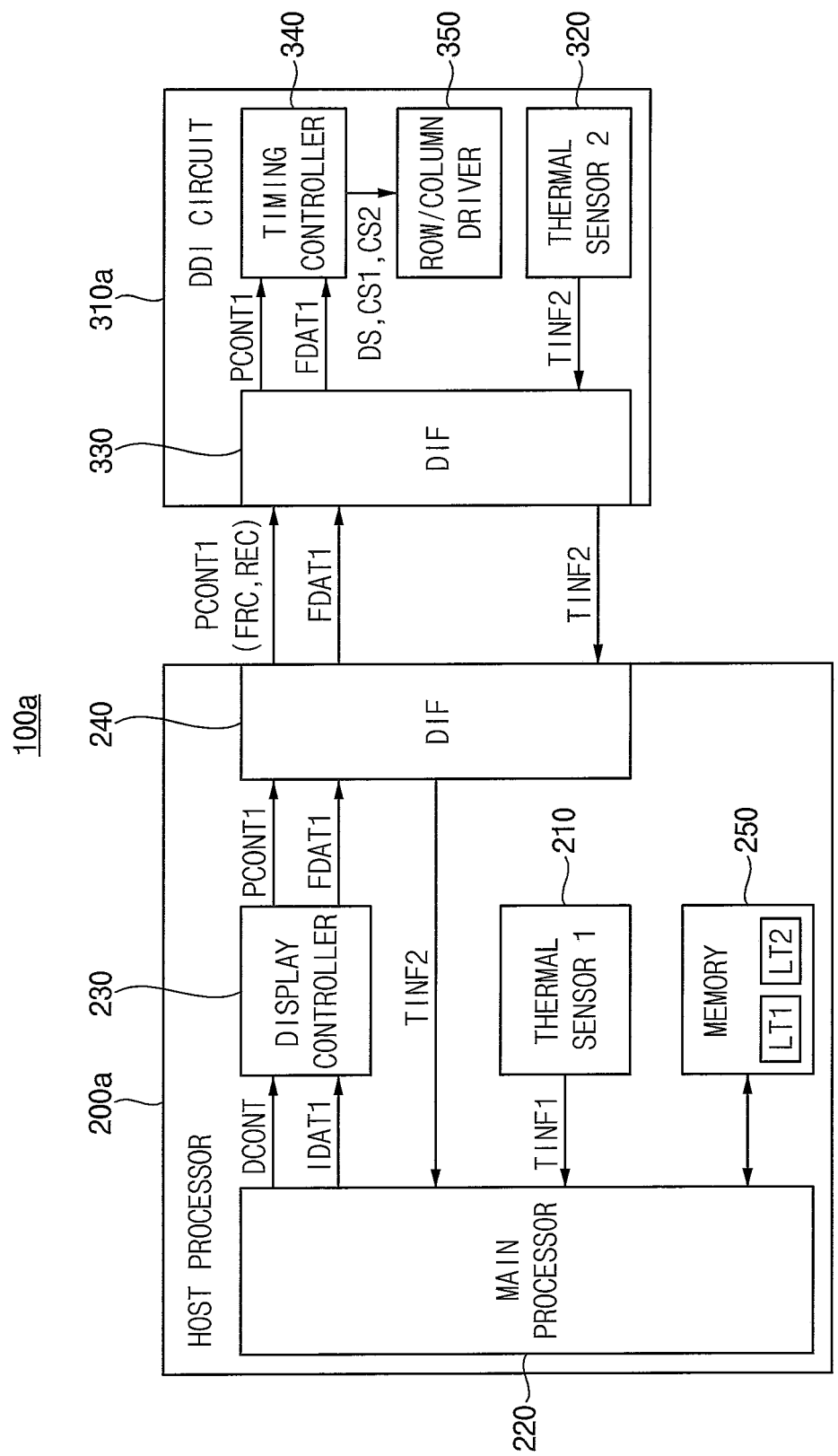
FIG. 2 is a block diagram illustrating an example of a display system of FIG. 1.

FIG. 2 is a block diagram illustrating an example of a display system of FIG. 1.

Referring to FIG. 2, a display system 100a includes a host processor 200a and a display driver integrated circuit 310a. For convenience of illustration, the display panel 360 in FIG. 1 is omitted.

The host processor 200a may include a first thermal sensor 210, a main processor 220, a display controller 230, a display interface (DIF) 240 and a memory 250. In some embodiments, the first thermal sensor 210 may be integrated with the main processor 220, the display controller 230, the display interface 240, and the memory 250 on a semiconductor substrate to form the host processor 200a.

The first thermal sensor 210 may be the same as the first thermal sensor 210 in FIG. 1, and may generate the first temperature information TINF1. For example, the first thermal sensor 210 of FIG. 2 may have the same configuration as the first thermal sensor 210 of FIG. 2.

Figure 6:
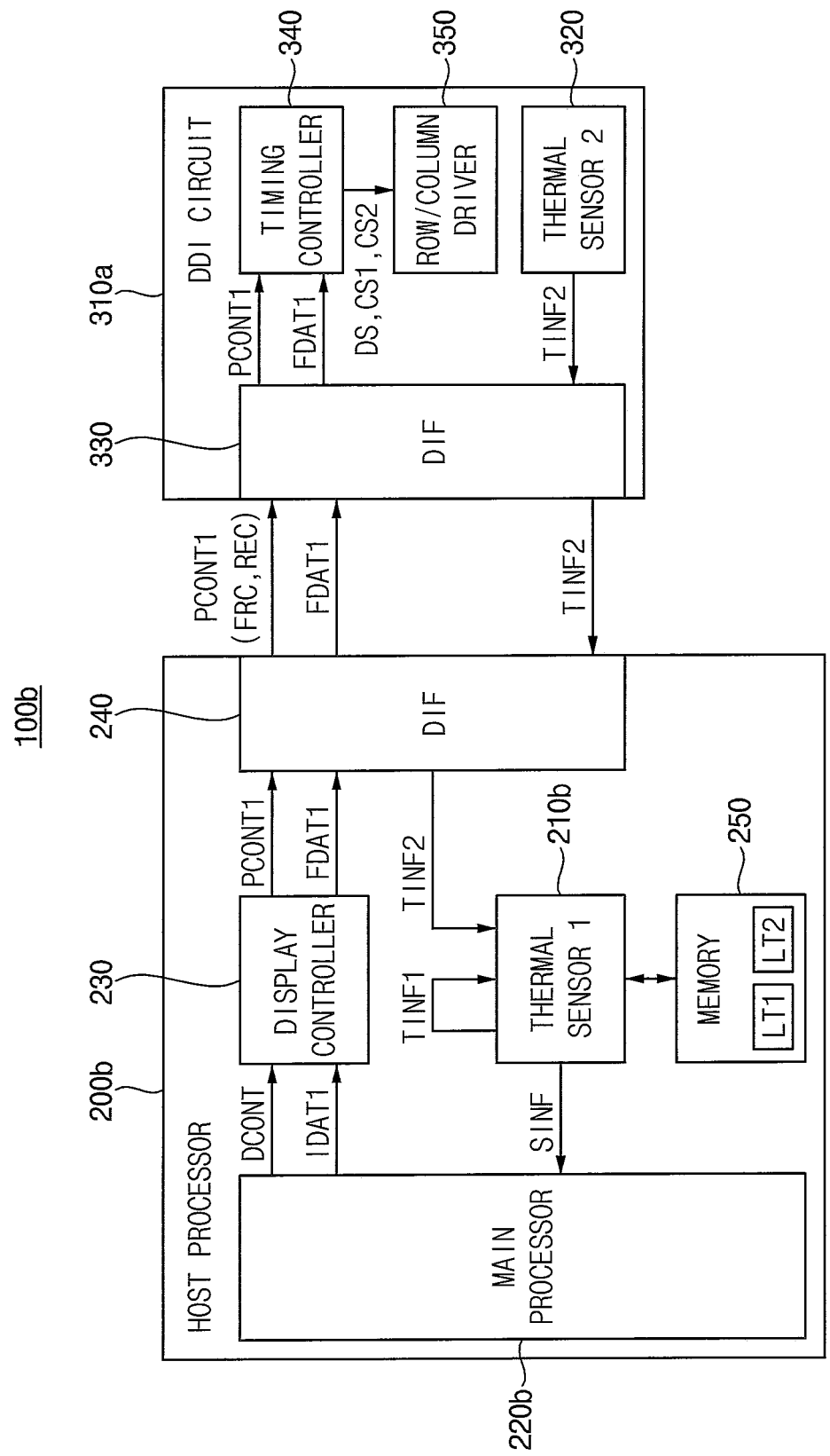
FIGS. 6 and 7 are block diagrams illustrating other examples of a display system of FIG. 1.

The main processor 220 may control an overall operation of the host processor 200a, and may provide first image data IDAT1 used to generate first frame data FDAT1. The main processor 220 may receive the first temperature information TINF1 and the second temperature information TINF2, and may generate a first control signal DCONT used to generate the first performance control signal PCONT1 based on the first temperature information TINF1 and the second temperature information TINF2. FIG. 2 illustrates an example where the main processor 220 receives the first temperature information TINF1 and the second temperature information TINF2 from the first thermal sensor 210 and the second thermal sensor 320, respectively. The present invention is not limited thereto. In an embodiment, a main processor, as shown in FIG. 6, does not receive both the first temperature information TINF1 and the second temperature information TINF from the first thermal sensor 210 and the second thermal sensor 320. The main processor of FIG. 6 will be discussed later. For example, the main processor 220 may include a central processing unit (CPU), or the like.

The display controller 230 may control operations of the display device 300 and the display driver integrated circuit 310a, and may generate and output the first performance control signal PCONT1 and the first frame data FDAT1 based on the first control signal DCONT and the first image data IDAT1. The first performance control signal PCONT1 may be used to increase or decrease the performance of the display panel 360. For example, the first frame data FDAT1 may be generated and output in the form of a packet. The display controller 230 may be referred to as a display processing unit (DPU).

The display interface 240 may transmit the first performance control signal PCONT1 and the first frame data FDAT1 to the display driver integrated circuit 310a, and may receive the second temperature information TINF2 from the display driver integrated circuit 310a.

In some example embodiments, the display interface 240 may be implemented based on one of various display interface standards, e.g., one of a mobile industry processor interface (MIPI), a high definition multimedia interface (HDMI), a display port (DP), a low power display port (LPDP) and an advanced low power display port (ALPDP).

The memory 250 may store instructions and data for the operation of the host processor 200a, and may store a first look-up table LT1 and a second look-up table LT2 that are used to generate the first performance control signal PCONT1.

In some example embodiments, the memory 250 may include a volatile memory, such as a dynamic random access memory (DRAM), a static random access memory (SRAM), or the like. In some example embodiments, the memory 250 may include a nonvolatile memory, such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like. In some example embodiments, the memory 250 may further include a solid state drive (SSD), a universal flash storage (UFS), a multi-media card (MMC), an embedded multi-media card (eMMC), a secure digital (SD) card, a micro SD card, a memory stick, a chip card, a universal serial bus (USB) card, a smart card, a compact flash (CF) card, or the like.

Although not illustrated in FIG. 2, the host processor 200a may further include a system bus, a plurality of functional modules and a power management integrated circuit (PMIC). The system bus may correspond to a signal transmission path between the components in the host processor 200a. The plurality of functional modules may perform various functions of the host processor 200a. The power management integrated circuit may provide operating voltages to the components in the host processor 200a.

In some example embodiments, the plurality of functional modules may include a communication module that performs a communication function (e.g., a code division multiple access (CDMA) module, a long term evolution (LTE) module, a radio frequency (RF) module, an ultra-wideband (UWB) module, a wireless local area network (WLAN) module, a worldwide interoperability for a microwave access (WIMAX) module, or the like), a camera module that performs a camera function, an input-output (I/O) module that performs a user interface function (e.g., a touch panel module that performs a touch sensing function), and an audio module including a microphone (MIC) module, a speaker module, or the like, that performs an I/O of audio signals. In some example embodiments, the plurality of functional modules may further include a global positioning system (GPS) module, a gyroscope module, or the like.

The display driver integrated circuit 310a may include a second thermal sensor 320, a display interface 330, a timing controller 340 and a row/column driver 350. In some embodiments, the second thermal sensor 320 may be integrated with the display interface 330, the timing controller 340, and the row/column driver 350 on a semiconductor substrate to form the display driver integrated circuit 310a.

The second thermal sensor 320 may be the same as the second thermal sensor 320 in FIG. 1, and may generate the second temperature information TINF2. For example, the second thermal sensor 320 of FIG. 2 may have the same configuration as the second thermal sensor 320 of FIG. 2.

The display interface 330 may transmit the second temperature information TINF2 to the host processor 200a, and may receive the first performance control signal PCONT1 and the first frame data FDAT1 from the host processor 200a. For example, the display interface 330 may be implemented based on the display interface standard that is substantially the same as that of the display interface 240. In some embodiments, the display interface 330 and the display interface 240 may communicate with each other using the same display interface standard.

The timing controller 340 may generate a first control signal CS1, a second control signal CS2 and a data signal DS based on the first performance control signal PCONT1 and the first frame data FDAT1.

The row/column driver 350 may generate a plurality of data voltages (e.g., a data voltage VDAT in FIG. 9) and a plurality of scan signals (e.g., a scan signal SSC in FIG. 9) that are provided to the display panel 360 based on the first control signal CS1, the second control signal CS2 and the data signal DS. The display panel 360 may display a frame image corresponding to the first frame data FDAT1 based on the plurality of data voltages and the plurality of scan signals.

Although not illustrated in FIG. 2, the display driver integrated circuit 310a may further include a frame buffer, etc. The frame buffer may temporarily store the first frame data FDAT1.

In some example embodiments, the host processor 200a may set the first performance control signal PCONT1 such that a boosting operation is performed for increasing the performance of the display driver integrated circuit 310a and the display panel 360 based on the first performance control signal PCONT1.

For example, the main processor 220 may determine, based on the first temperature information TINF1 and the first look-up table LT1, a first duration that is allowed (or permissible) to maintain a first performance (e.g., a desired or intended performance) when the display driver integrated circuit 310a and the display panel 360 are set to operate with the first performance. For example, during the first duration, the display driver integrated circuit 310a and the display panel 360 may be set to operate at the first performance. The main processor 220 may determine, based on the second temperature information TINF2 and the second look-up table LT2, a second duration that is allowed to maintain the first performance when the display driver integrated circuit 310a and the display panel 360 are set to operate with the first performance. For example, during the second duration, the display driver integrated circuit 310a and the display panel 360 may be set to operate at the first performance. The main processor 220 may generate the first control signal DCONT used to set the first performance control signal PCONT1 based on the first duration and the second duration. The display controller 230 may set the first performance control signal PCONT1 based on the first control signal DCONT.

For example, the first performance may represent a performance higher than a current (or present) performance of the display driver integrated circuit 310a and the display panel 360. For example, the first performance may represent the maximum performance within changeable ranges of the performance of the display driver integrated circuit 310a and the display panel 360.

For example, each of the first duration and the second duration may represent the maximum time interval during which the display driver integrated circuit 310a and the display panel 360 can endure or withstand (e.g., normally operate without being damaged) while the display driver integrated circuit 310a and the display panel 360 operate with the first performance. For example, the first duration may represent a time interval from a time point at which the display driver integrated circuit 310a and the display panel 360 start to operate with the first performance to a time point at which the first temperature information TINF1 reaches a first value while the display driver integrated circuit 310a and the display panel 360 operate with the first performance. The second duration may represent a time interval from the time point at which the display driver integrated circuit 310a and the display panel 360 start to operate with the first performance to a time point at which the second temperature information TINF2 reaches the first value while the display driver integrated circuit 310a and the display panel 360 operate with the first performance. For example, the first value may represent the maximum temperature at which the display system 100a (e.g., the host processor 200a, the display driver integrated circuit 310a and/or the display panel 360) may normally operate.

For example, the main processor 220 may select one of the first duration and the second duration, and the first performance control signal PCONT1 may be set based on the selected duration. For example, a relatively short duration may be selected from among the first duration and second duration. For example, when the first duration is shorter than the second duration, the main processor 220 may select the first duration and may generate the first control signal DCONT based on the first duration, and the display controller 230 may set the first performance control signal PCONT1 such that the display driver integrated circuit 310a and the display panel 360 operate with the first performance for the first duration.

In other example embodiments, the host processor 200a may set the first performance control signal PCONT1 such that a throttling operation is performed for decreasing the performance of the display driver integrated circuit 310a and the display panel 360 based on the first performance control signal PCONT1.

For example, the main processor 220 may determine, based on the first temperature information TINF1 and the first look-up table LT1, a third duration that is allowed (or permissible) to maintain a second performance (e.g., a desired or intended performance) when the display driver integrated circuit 310a and the display panel 360 are set to operate with the second performance. The main processor 220 may determine, based on the second temperature information TINF2 and the second look-up table LT2, a fourth duration that is allowed to maintain the second performance when the display driver integrated circuit 310a and the display panel 360 are set to operate with the second performance. The main processor 220 may generate the first control signal DCONT used to set the first performance control signal PCONT1 based on the third duration and the fourth duration. The display controller 230 may set the first performance control signal PCONT1 based on the first control signal DCONT.

For example, the second performance may be a performance lower than the current performance of the display driver integrated circuit 310a and the display panel 360. For example, each of the third duration and the fourth duration may represent a time interval during which the display driver integrated circuit 310a and the display panel 360 may normally operate while inducing a decrease (or cooling) of temperature. For example, one of the third duration and the fourth duration may be selected, and the first performance control signal PCONT1 may be set based on the selected duration.

In some example embodiments, the first performance control signal PCONT1 may include at least one of a frame rate control signal FRC used to adjust the frame rate of the display panel 360 and a resolution control signal REC used to adjust the resolution of the display panel 360. For example, the display controller 230 may include a frame rate controller that generates the frame rate control signal FRC and a resolution controller that generates the resolution control signal REC.

In the display system according to example embodiments, the performance of the display device may be controlled based on not only the first temperature information TINF1 that is obtained from the first thermal sensor 210 inside the host processor 200a but also the second temperature information TINF2 that is obtained from the second thermal sensor 320 outside the host processor 200a. For example, a feedback operation (e.g., the throttling operation) may be performed to reduce the amount of heat emitted from the display device, and a feedforward operation may also be performed to check in advance how long the display device may normally operate when the performance of the display device is to be boosted and to drive the display system based on a result of checking. Accordingly, the performance of the display system may be adaptively and/or efficiently controlled, and may be instantaneously (or momentarily) maximized by the feedforward operation.

FIGS. 3A, 3B, 4A, 4B, 5A and 5B are diagrams for describing an operation of a display system of FIG. 2.

Referring to FIGS. 3A and 3B, an example of the first look-up table LT1 and the second look-up table LT2 that are stored in the memory 250 included in the host processor 200a of FIG. 2 is illustrated.

As illustrated in FIG. 3A, the first look-up table LT1 may include a plurality of entries, each entry representing a relationship of the first temperature information TINF1 that is obtained from the first thermal sensor 210, the performance of the display device 300 (e.g., the performance of the display driver integrated circuit 310a and the display panel 360) and a duration that is allowed to maintain a specific performance.

For example, the first look-up table LT1 may include durations DUR_1_1_1, DUR_1_1_2 DUR_1_1_M that are allowed to maintain performances PERF_D_1, PERF_D_2, . . . , PERF_D_M, respectively, by the display device 300 when the first temperature information TINF1 corresponds to a value TEMP_H_1. The first look-up table LT1 may include durations DUR_1_2_1, DUR_1_2_2, . . . , DUR_1_2_M that are allowed to maintain the performances PERF_D_1, PERF_D_2, . . . , PERF_D_M, respectively, by the display device 300 when the first temperature information TINF1 corresponds to a value TEMP_H_2. The first look-up table LT1 may include durations DUR_1_K_1, DUR_1_K_2, . . . , DUR_1_K_M that are allowed to maintain the performances PERF_D_1, PERF_D_2, . . . , PERF_D_M, respectively, by the display device 300 when the first temperature information TINF1 corresponds to a value TEMP_H_K. For example, each of the values TEMP_H_1, TEMP_H_2, . . . , TEMP_H_K may represent a specific temperature or a specific temperature range.

Similarly, as illustrated in FIG. 3B, the second look-up table LT2 may include a plurality of entries, each entry representing a relationship of the second temperature information TINF2 that is obtained from the second thermal sensor 320, the performance of the display device 300 and the duration that is allowed to maintain the specific performance.

For example, the second look-up table LT2 may include durations DUR_2_1_1, DUR_2_1_2 . . . , DUR_2_1_M that are allowed to maintain the performances PERF_D_1, PERF_D_2, . . . , PERF_D_M, respectively, by the display device 300 when the second temperature information TINF2 corresponds to a value TEMP_D_1. The second look-up table LT2 may include durations DUR_2_2_1, DUR_2_2_2, . . . , DUR_2_2_M that are allowed to maintain the performances PERF_D_1, PERF_D_2, . . . , PERF_D_M, respectively, by the display device 300 when the second temperature information TINF2 corresponds to a value TEMP_D_2. The second look-up table LT2 may include durations DUR_2_K_1, DUR_2_K_2, . . . , DUR_2_K_M that are allowed to maintain the performances PERF_D_1, PERF_D_2, . . . , PERF_D_M, respectively, by the display device 300 when the second temperature information TINF2 corresponds to a value TEMP_D_K.

In some example embodiments, the first performance control signal PCONT1 may be set such that the display device 300 operates with a desired performance, for example, the performance PERF_D_1. For example, when the first temperature information TINF1 corresponds to the value TEMP_H_1, the duration DUR_1_1_1 during which the display device 300 may operate with the performance PERF_D_1 until (or before) the display device 300 reaches the maximum temperature may be obtained based on the first look-up table LT1. In addition, when the second temperature information TINF2 corresponds to the value TEMP_D_2, the duration DUR_2_2_1 during which the display device 300 may operate with the performance PERF_D_1 until the display device 300 reaches the maximum temperature may be obtained based on the second look-up table LT2. After that, the shortest duration, for example, the duration DUR_1_1_1 may be selected from among the obtained durations DUR_1_1_1 and DUR_2_2_1. Finally, the first performance control signal PCONT1 may be set such that the display device 300 operates with the desired performance PERF_D_1 for the selected duration DUR_1_1_1.

Figure 4A:
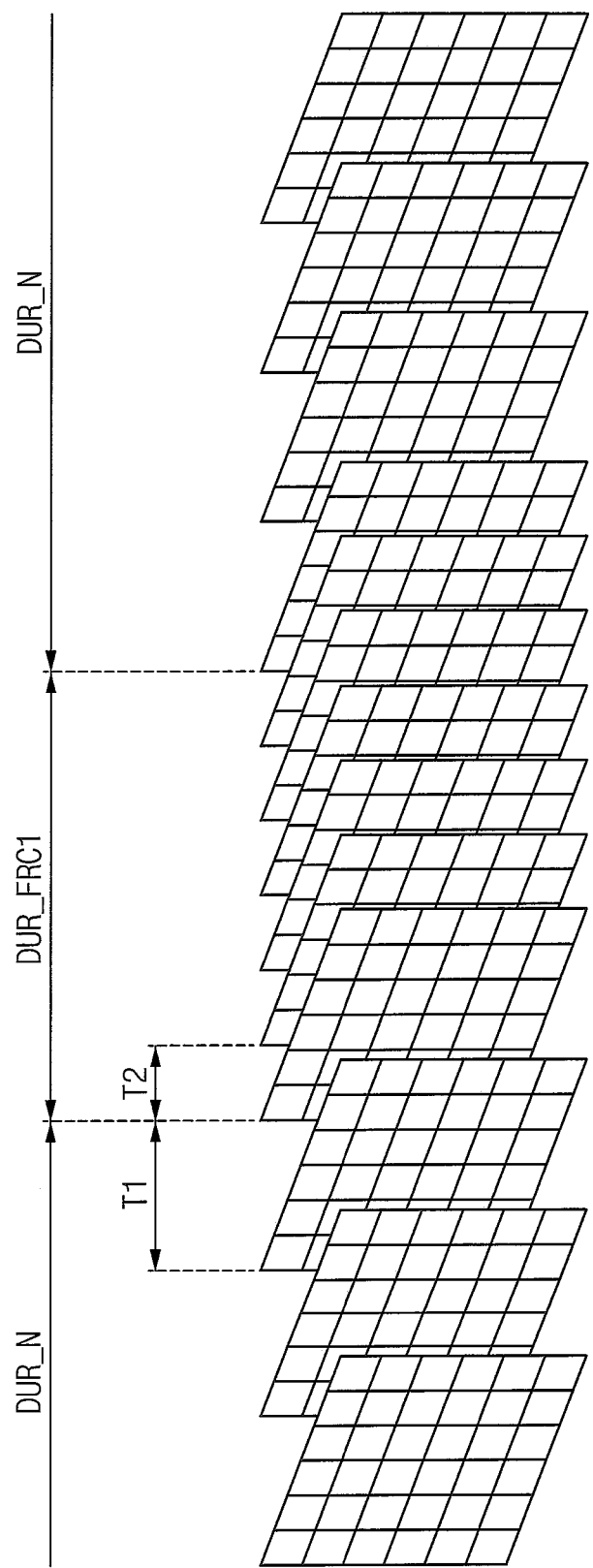
Figure 4B:
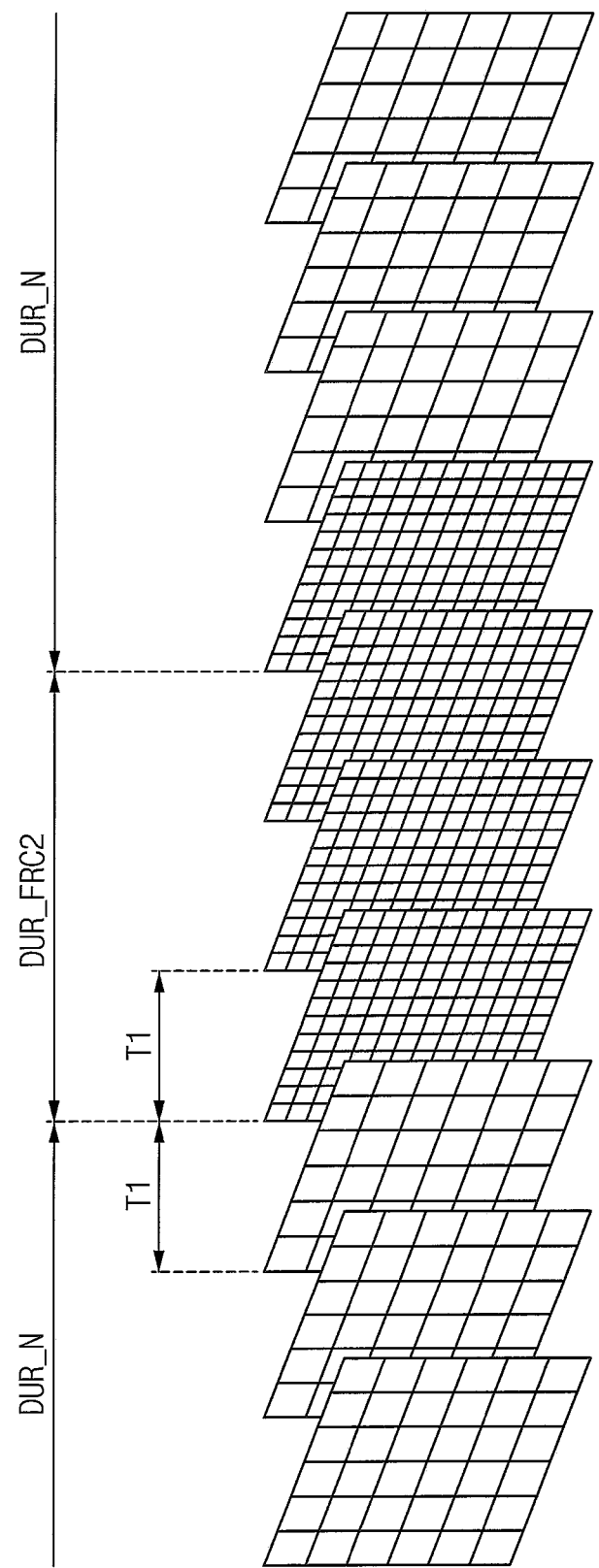

Referring to FIGS. 4A and 4B, examples where the first performance control signal PCONT1 is set to perform the boosting operation for increasing the performance of the display device 300 is illustrated. FIGS. 4A and 4B illustrate configurations of frame images displayed on the display device 300 over time.

As illustrated in FIGS. 4A and 4B, during a normal operation phase DUR_N, the display device 300 may display frame images with a first frame rate (or a first driving frequency) and a first resolution. The reciprocal of a first time interval T1 between two adjacent frame images in the normal operation phase DUR_N may correspond to the first frame rate. For convenience of illustration, the resolution of one frame image is illustrated by the number of small squares included in the one frame image. For example, it may represent that the resolution of one frame image increases as the number of small squares increases in the one frame image.

As illustrated in FIG. 4A, during a performance control phase DUR_FRC1 in which the boosting operation is performed based on the frame rate control signal FRC included in the first performance control signal PCONT1, the display device 300 may display frame images with a second frame rate (or a second driving frequency) and the first resolution. The second frame rate may be higher than the first frame rate. The reciprocal of a second time interval T2 between two adjacent frame images in the performance control phase DUR_FRC1 may correspond to the second frame rate. For example, the second frame rate may be about twice the first frame rate.

As illustrated in FIG. 4B, during a performance control phase DUR_REC1 in which the boosting operation is performed based on the resolution control signal REC included in the first performance control signal PCONT1, the display device 300 may display frame images with the first frame rate and a second resolution. The second resolution may be higher than the first resolution. For example, the second resolution may be about twice the first resolution.

Figure 5A:
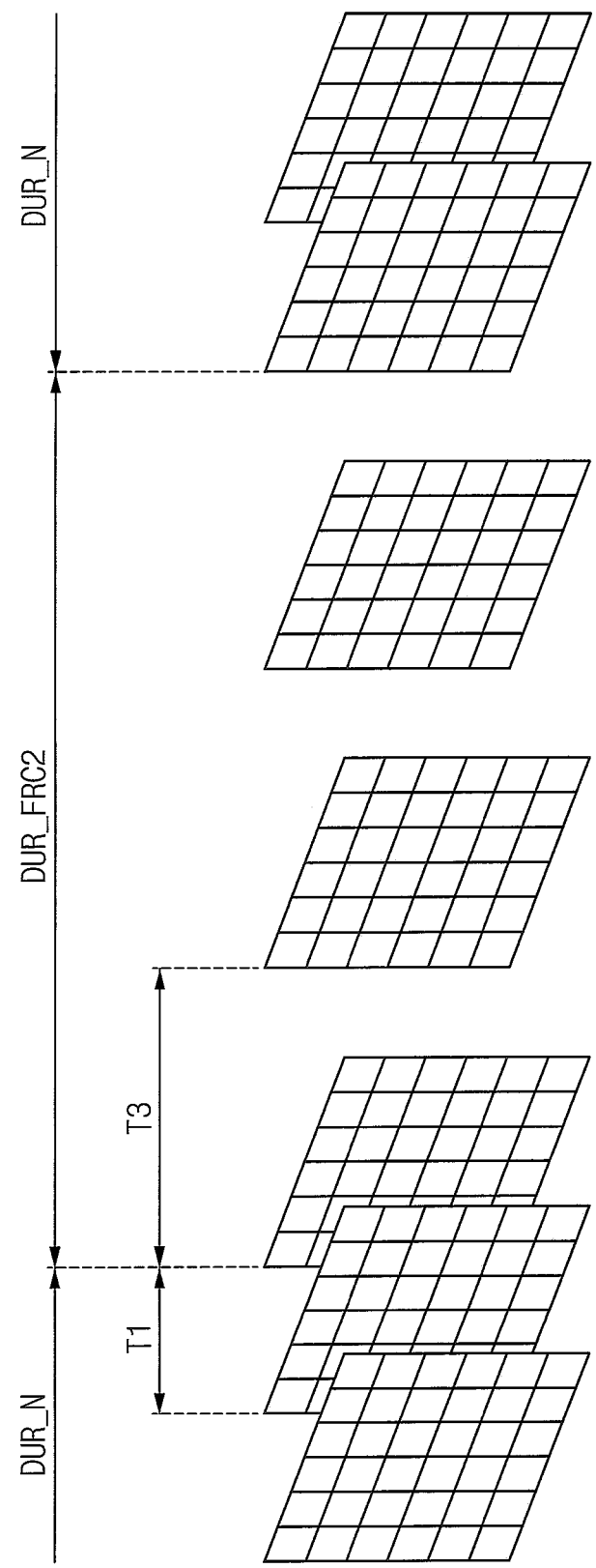
Figure 5B:
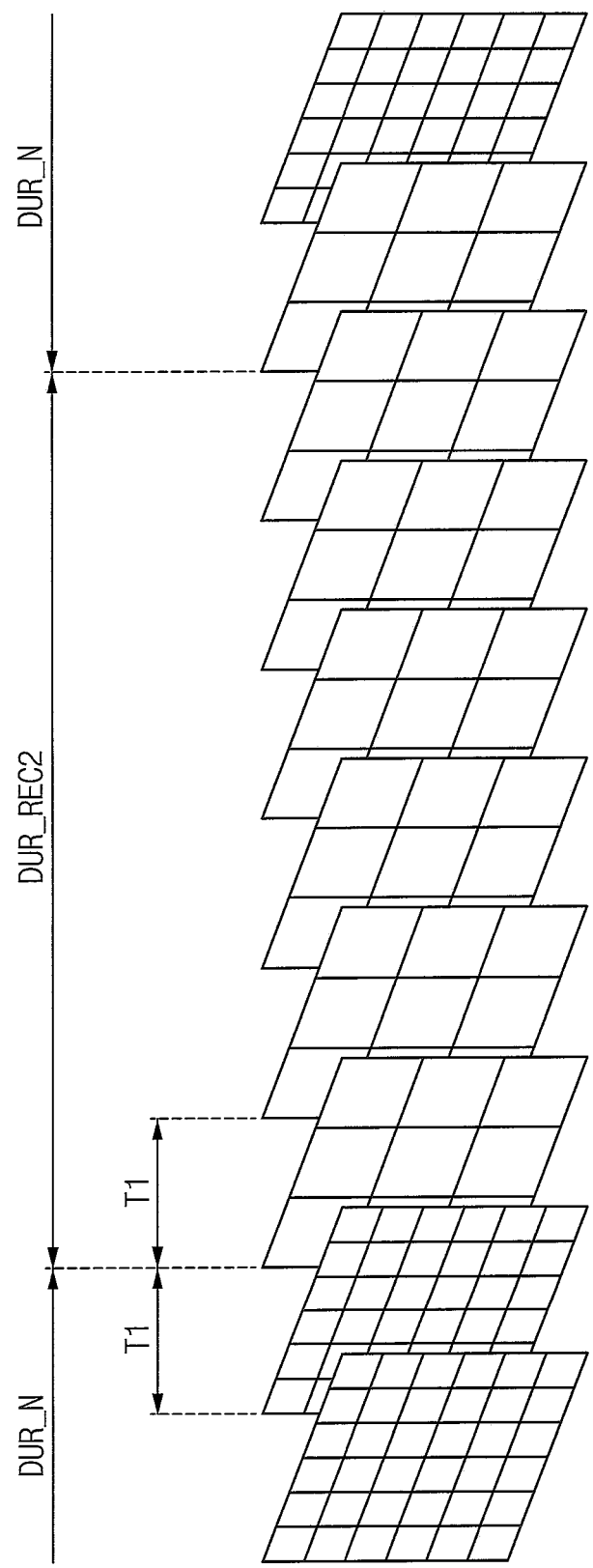

Referring to FIGS. 5A and 5B, examples where the first performance control signal PCONT1 is set to perform the throttling operation for decreasing the performance of the display device 300 is illustrated. The descriptions repeated with FIGS. 4A and 4B will be omitted.

As illustrated in FIG. 5A, during a performance control phase DUR_FRC2 in which the throttling operation is performed based on the frame rate control signal FRC included in the first performance control signal PCONT1, the display device 300 may display frame images with a third frame rate (or a third driving frequency) and the first resolution. The third frame rate may be lower than the first frame rate. The reciprocal of a third time interval T3 between two adjacent frame images in the performance control phase DUR_FRC2 may correspond to the third frame rate. For example, the third frame rate may be about a half of the first frame rate.

As illustrated in FIG. 5B, during a performance control phase DUR_REC2 in which the throttling operation is performed based on the resolution control signal REC included in the first performance control signal PCONT1, the display device 300 may display frame images with the first frame rate and a third resolution. The third resolution may be lower than the first resolution. For example, the third resolution may be about a half of the first resolution.

Although FIGS. 4A, 4B, 5A and 5B illustrate examples where only one of the frame rate and the resolution is adjusted in the performance control phase, example embodiments are not limited thereto. For example, both the frame rate and the resolution may be adjusted in the performance control phase.

Figure 7:
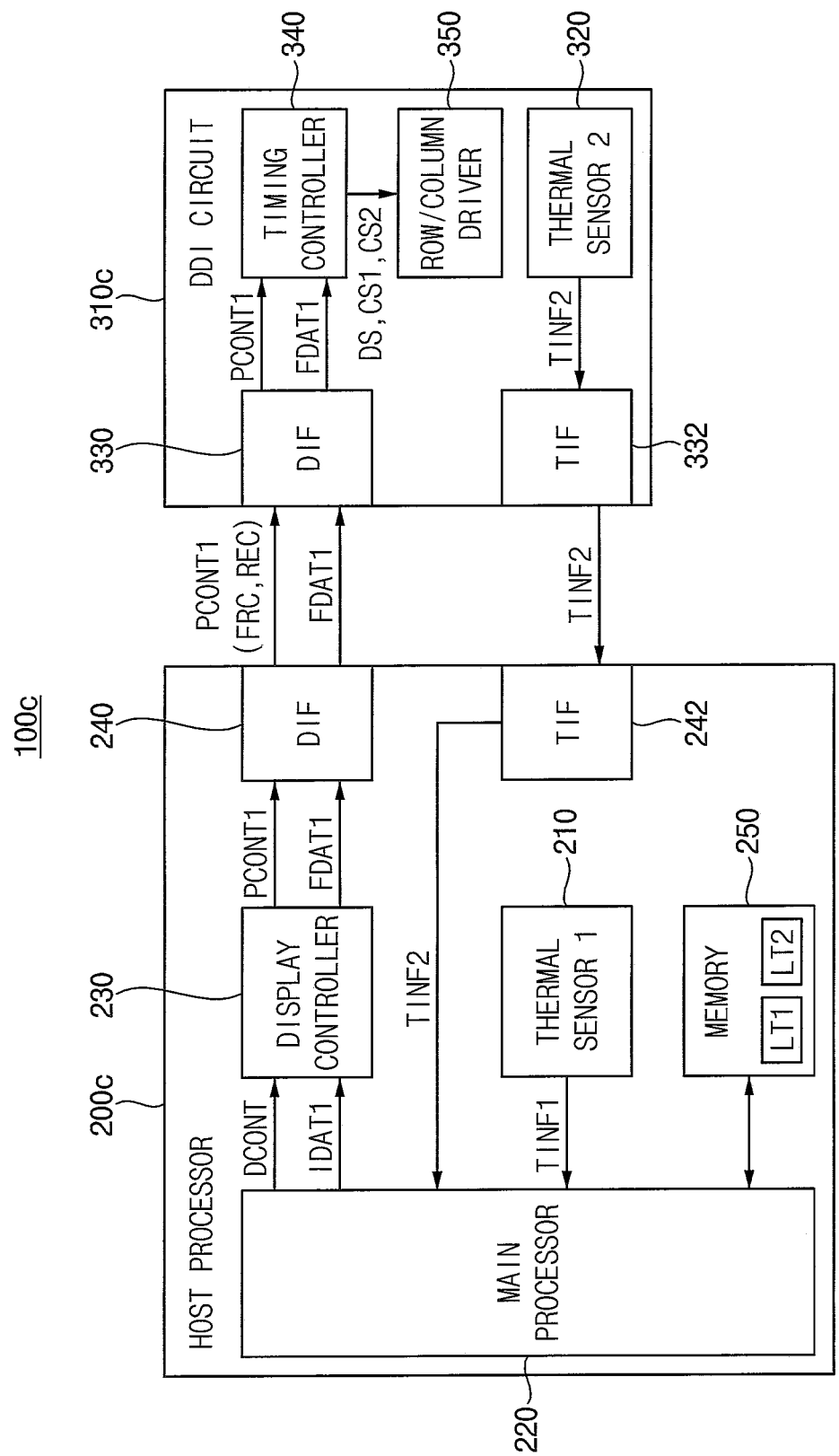

FIGS. 6 and 7 are block diagrams illustrating other examples of a display system of FIG. 1. The descriptions repeated with FIG. 2 will be omitted.

Referring to FIG. 6, a display system 100b includes a host processor 200b and a display driver integrated circuit 310a.

The display system 100b may be substantially the same as the display system 100a of FIG. 2, except that operations of a first thermal sensor 210b and a main processor 220b included in the host processor 200b are partially changed.

The first thermal sensor 210b may generate the first temperature information TINF 1, may receive the second temperature information TINF2, may select one of the first temperature information TINF1 and the second temperature information TINF2, and may provide selected information SINF to the main processor 220b. FIG. 6 illustrates an example where the first thermal sensor 210b directly receives the second temperature information TINF2.

The first thermal sensor 210b may perform an operation of determining the first duration that is allowed to maintain the first performance based on the first temperature information TINF1 and the first look-up table LT1, an operation of determining the second duration that is allowed to maintain the first performance based on the second temperature information TINF2 and the second lookup table LT2, and an operation of selecting one of the first duration and the second duration, as described with reference to FIG. 2. Therefore, the selected information SINF may include selected temperature information (e.g., the selected one of the first temperature information TINF1 and the second temperature information TINF2) and information associated with the selected duration.

The main processor 220b may receive the selected information SINF, and may generate the first control signal DCONT used to set the first performance control signal PCONT1 based on the selected information SINF.

Referring to FIG. 7, a display system 100c includes a host processor 200c and a display driver integrated circuit 310c.

The display system 100c may be substantially the same as the display system 100a of FIG. 2, except that the host processor 200c further includes a temperature information interface (TIF) 242 and the display driver integrated circuit 310c further includes a temperature information interface 332.

The temperature information interface 242 may receive the second temperature information TINF2 from the display driver integrated circuit 310c. The temperature information interface 332 may transmit the second temperature information TINF2 to the host processor 200c.

In some example embodiments, the temperature information interfaces 242 and 332 may be formed individually and/or independently from the display interfaces 240 and 330, and may be implemented based on an interface standard that is different from that of the display interfaces 240 and 330. For example, the temperature information interfaces 242 and 332 may be implemented based on a serial interface such as a serial peripheral interface (SPI), a universal asynchronous receiver/transmitter (UART), or the like, or may be implemented based on a pulse width modulation (PWM) scheme.

In some example embodiments, although not illustrated in detail, the display system 100b of FIG. 6 may further include the temperature information interfaces 242 and 332 illustrated in FIG. 7.

Figure 8:
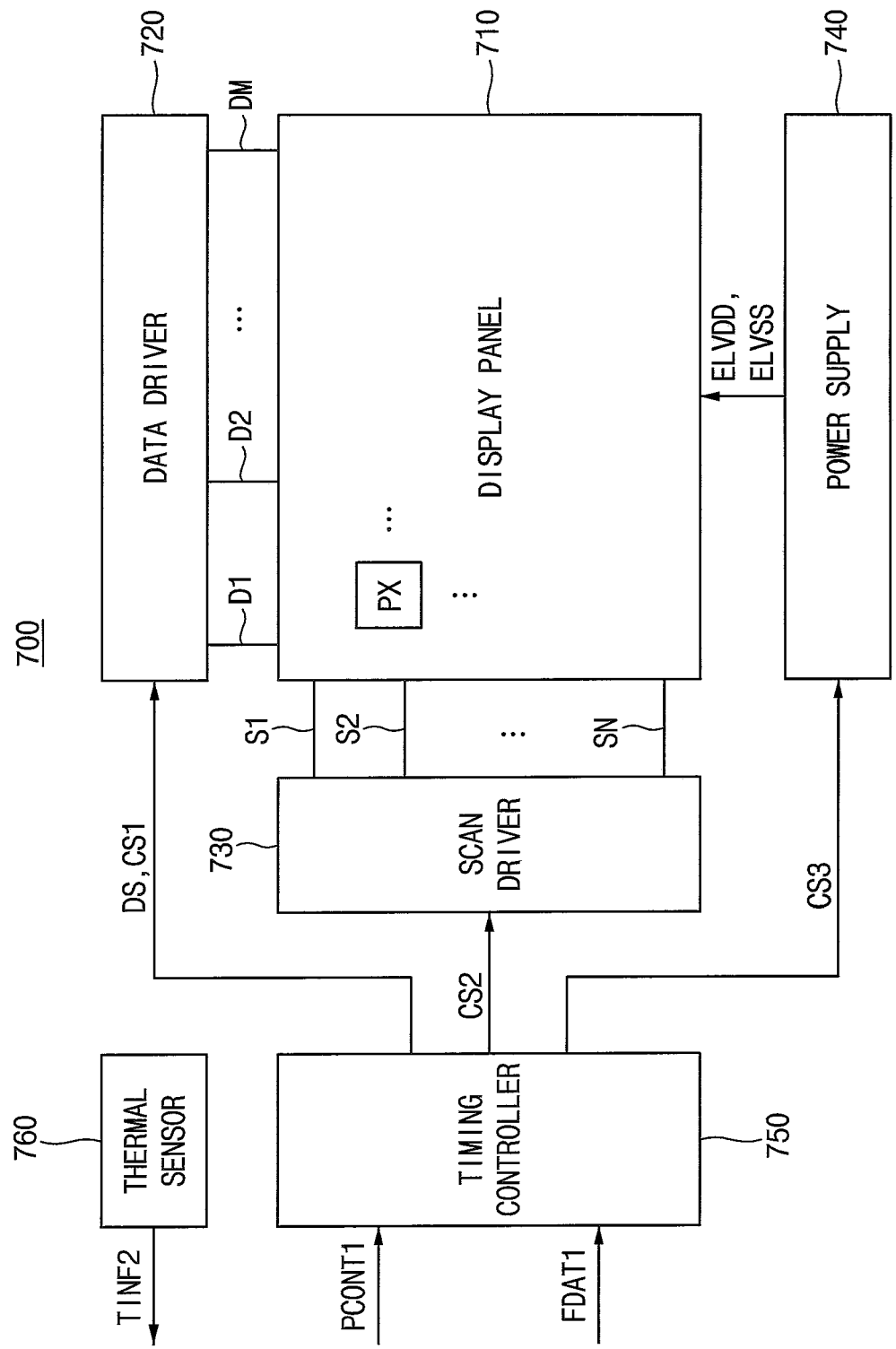
FIG. 8 is a block diagram illustrating an example of a display device included in a display system according to example embodiments.

FIG. 8 is a block diagram illustrating an example of a display device included in a display system according to example embodiments.

Referring to FIG. 8, a display device 700 includes a display panel 710 and a display driver integrated circuit. The display driver integrated circuit may include a data driver 720, a scan driver 730, a power supply 740, a timing controller 750 and a thermal sensor 760.

The display panel 710 may operate (e.g., displays an image) based on image data (e.g., frame data). The display panel 710 may be connected to the data driver 720 through a plurality of data lines D1, D2, . . . , DM, and may be connected to the scan driver 730 through a plurality of scan lines S1, S2, . . . , SN. The plurality of data lines D1, D2, . . . , DM may extend in a first direction, and the plurality of scan lines S1, S2, . . . , SN may extend in a second direction crossing (e.g., substantially perpendicular to) the first direction.

The display panel 710 may include a plurality of pixels PX that are arranged in a matrix formation having a plurality of rows and a plurality of columns. As will be described with reference to FIG. 9, each of the plurality of pixels PX may include a light emitting element and at least one transistor for driving the light emitting element. Each of the plurality of pixels PX may be electrically connected to a respective one of the plurality of data lines D1, D2, . . . , DM and a respective one of the plurality of scan lines S1, S2, . . . , SN.

In some example embodiments, the display panel 710 may be a self-emitting display panel that emits light without the use of a backlight unit. For example, the display panel 710 may be an organic light emitting display panel that includes an organic light emitting diode (OLED) as the light emitting element.

In some example embodiments, each of the plurality of pixels PX included in the display panel 710 may have various configurations depending on a driving scheme of the display device 700. For example, the display device 700 may be driven with an analog or a digital driving scheme. While the analog driving scheme produces grayscale using variable voltage levels corresponding to input data, the digital driving scheme produces grayscale using variable time duration in which the light emitting diode emits light. The analog driving scheme is difficult to implement because it requires a driving integrated circuit (IC) that is complicated to manufacture if the display is large and has high resolution. The digital driving scheme, on the other hand, may accomplish the required high resolution through a simpler IC structure. An example of each of the plurality of pixels PX will be described with reference to FIG. 9.

The timing controller 750 may control overall operations of the display device 700. For example, the timing controller 750 may receive the first performance control signal PCONT1 and other input control signals from the host processor 200, and may provide predetermined control signals CS1, CS2 and CS3 to the data driver 720, the scan driver 730 and the power supply 740 based on the first performance control signal PCONT1 and the other input control signals to control the operations of the display device 700. For example, the control signals CS1, CS2 and CS3 may include a vertical synchronization signal and a horizontal synchronization signal that are used inside the display device 700.

The timing controller 750 may receive the first frame data FDAT1 from the host processor 200, and generates a data signal DS for displaying an image based on the first frame data FDAT1. For example, the first frame data FDAT1 may include red image data, green image data and blue image data. In addition, the first frame data FDAT1 may include white image data. Alternatively, the first frame data FDAT1 may include magenta image data, yellow image data, cyan image data, or the like.

The data driver 720 may generate a plurality of data voltages based on the control signal CS1 and the data signal DS, and may apply the plurality of data voltages to the display panel 710 through the plurality of data lines D1, D2, . . . , DM. For example, the data driver 720 may include a digital-to-analog converter (DAC) that converts the data signal DS in a digital form into the plurality of data voltages in an analog form.

The scan driver 730 may generate a plurality of scan signals based on the control signal CS2, and may apply the plurality of scan signals to the display panel 710 through the plurality of scan lines S1, S2, . . . , SN. The plurality of scan lines S1, S2, . . . , SN may be sequentially activated based on the plurality of scan signals.

The thermal sensor 760 may generate the second temperature information TINF2 that represents a current temperature and/or an operating temperature inside the display driver integrated circuit.

The thermal sensor 760 may correspond to the second thermal sensor 320 in FIG. 2, the timing controller 750 may correspond to the timing controller 340 in FIG. 2, and the data driver 720 and the scan driver 730 may correspond to the row/column driver 350 in FIG. 2.

In some example embodiments, the data driver 720, the scan driver 730 and the timing controller 750 may be implemented as one integrated circuit. In other example embodiments, the data driver 720, the scan driver 730 and the timing controller 750 may be implemented as two or more integrated circuits. A driving module including at least the timing controller 750 and the data driver 720 may be referred to as a timing controller embedded data driver (TED).

The power supply 740 may supply a first power supply voltage ELVDD and a second power supply voltage ELVSS to the display panel 710 based on the control signal CS3. For example, the first power supply voltage ELVDD may be a high power supply voltage, and the second power supply voltage ELVSS may be a low power supply voltage.

In some example embodiments, at least some of the elements included in the display driver integrated circuit may be disposed, e.g., directly mounted, on the display panel 710, or may be connected to the display panel 710 in a tape carrier package (TCP) type. Alternatively, at least some of the elements included in the display driver integrated circuit may be integrated on the display panel 710. In some example embodiments, the elements included in the display driver integrated circuit may be respectively implemented with separate circuits/modules/chips. In other example embodiments, on the basis of a function, some of the elements included in the display driver integrated circuit may be combined into one circuit/module/chip, or may be further separated into a plurality of circuits/modules/chips.

Figure 9:
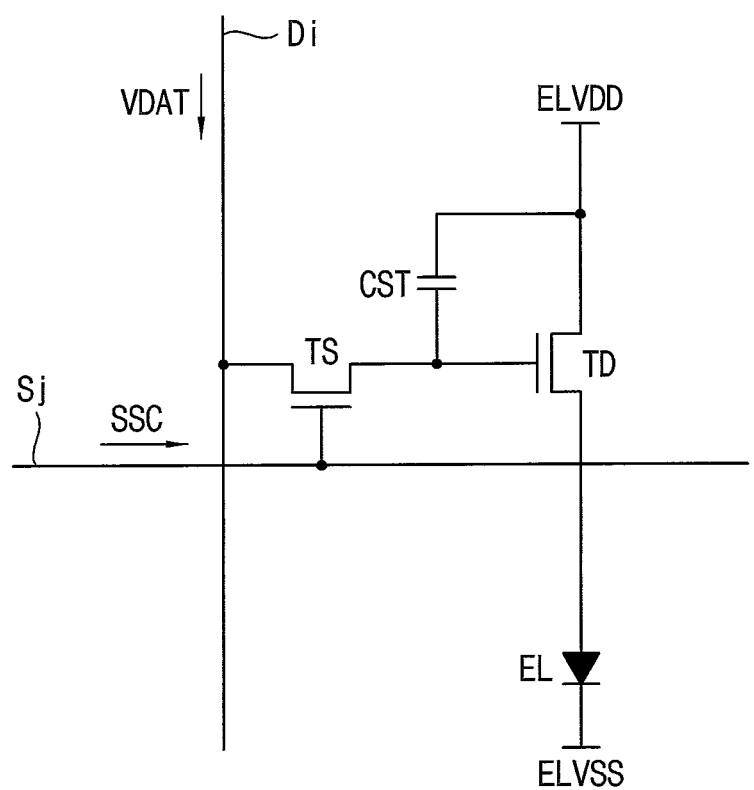
FIG. 9 is a circuit diagram illustrating an example of a pixel included in a display panel included in a display device of FIG. 8.

FIG. 9 is a circuit diagram illustrating an example of a pixel included in a display panel included in a display device of FIG. 8.

Referring to FIG. 9, each pixel PX may include a switching transistor TS, a storage capacitor CST, a driving transistor TD and an organic light emitting diode EL.

The switching transistor TS may have a first electrode connected to a data line Di, a second electrode connected to the storage capacitor CST, and a gate electrode connected to a scan line Sj. The switching transistor TS may transfer a data voltage VDAT received from the data driver 720 to the storage capacitor CST in response to a scan signal SSC received from the scan driver 730.

The storage capacitor CST may have a first electrode connected to the first power supply voltage ELVDD and a second electrode connected to a gate electrode of the driving transistor TD. The storage capacitor CST may store the data voltage VDAT transferred through the switching transistor TS.

The driving transistor TD may have a first electrode connected to the first power supply voltage ELVDD, a second electrode connected to the organic light emitting diode EL, and the gate electrode connected to the storage capacitor CST. The driving transistor TD may be turned on or off depending on the data voltage VDAT stored in the storage capacitor CST.

The organic light emitting diode EL may have an anode electrode connected to the driving transistor TD and a cathode electrode connected to the second power supply voltage ELVSS. The organic light emitting diode EL may emit light based on a current flowing from the first power supply voltage ELVDD to the second power supply voltage ELVSS while the driving transistor TD is turned on. The brightness of the pixel PX may increase as the current flowing through the organic light emitting diode EL increases.

Although FIG. 9 illustrates an organic light emitting diode pixel as an example of each pixel PX that may be included in the display panel 710, it would be understood that example embodiments are not limited to the organic light emitting diode pixel and example embodiment may be applied to any pixels of various types and configurations.

Figure 10:
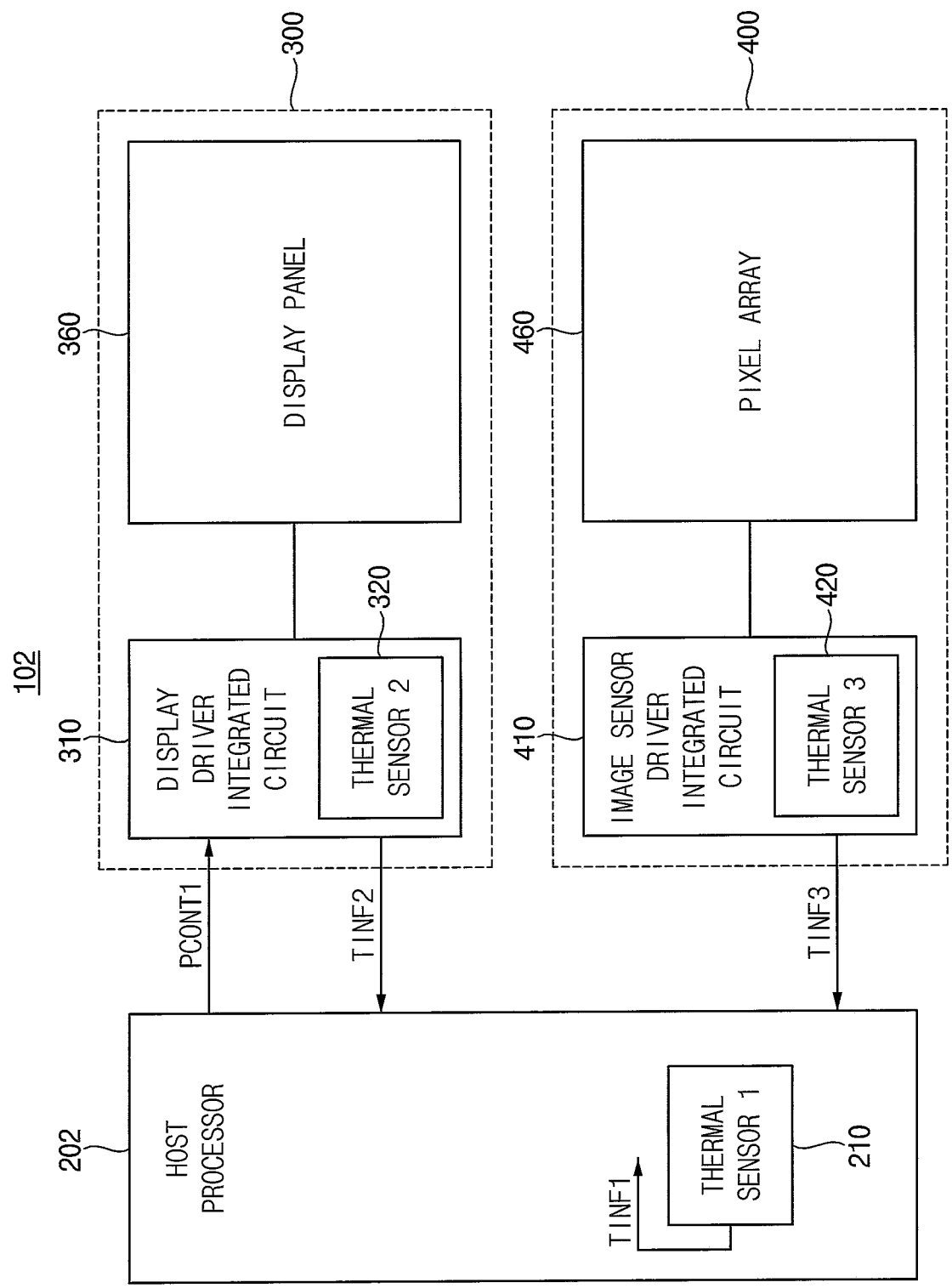
FIG. 10 is a block diagram illustrating a display system according to example embodiments.

FIG. 10 is a block diagram illustrating a display system according to example embodiments. The descriptions repeated with FIG. 1 will be omitted.

Referring to FIG. 10, a display system 102 includes a host processor 202, a display device 300 and an image sensor 400. The image sensor 400 includes an image sensor driver integrated (IDI) circuit 410 and a pixel array 460.

The display system 102 may be substantially the same as the display system 100 of FIG. 1, except that the display system 102 further includes the image sensor 400 and an operation of the host processor 202 is partially changed.

The image sensor driver integrated circuit 410 controls an operation of the image sensor 400, and includes a third thermal sensor 420 that is different from the first thermal sensor 210 and the second thermal sensor 320. For example, the third thermal sensor 420 may be integrated with transistors on a semiconductor substrate within the image sensor driver integrated circuit 410. The third thermal sensor 420 generates third temperature information TINF3. The third temperature information TINF3 may represent a current temperature and/or an operating temperature inside the image sensor driver integrated circuit 410.

The pixel array 460 may perform an image capture operation based on or under a control of the image sensor driver integrated circuit 410.

The host processor 202 generates a first performance control signal PCONT1 based on the first temperature information TINF1, the second temperature information TINF2 and the third temperature information TINF3, and outputs the first performance control signal PCONT1. The first performance control signal PCONT1 is used to increase or decrease performance of the display panel 360. The first temperature information TINF1 is internally obtained from the first thermal sensor 210 that is located inside the host processor 200. The second temperature information TINF2 is externally obtained from the second thermal sensor 320 that is located outside the host processor 200, and is received from the display driver integrated circuit 310. The third temperature information TINF3 is externally obtained from the third thermal sensor 420 that is located outside the host processor 200, and is received from the image sensor driver integrated circuit 410.

Detailed configurations and operations of the host processor 202, the display driver integrated circuit 310 and the image sensor driver integrated circuit 410 will be described with reference to FIGS. 11 and 12.

Figure 11:
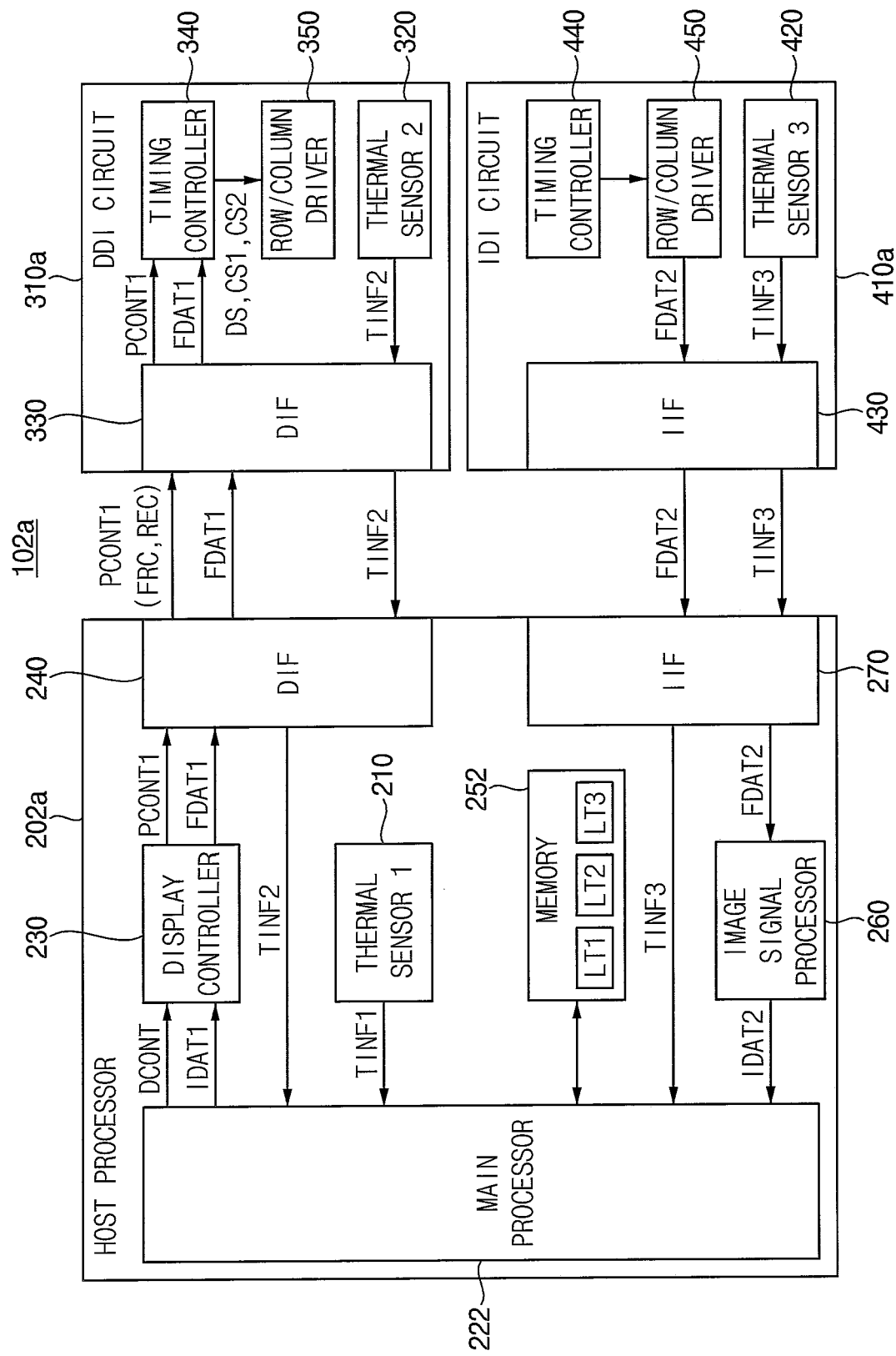
FIG. 11 is a block diagram illustrating an example of a display system of FIG. 10.

FIG. 11 is a block diagram illustrating an example of a display system of FIG. 10. The descriptions repeated with FIG. 2 will be omitted.

Referring to FIG. 11, a display system 102a includes a host processor 202a, a display driver integrated circuit 310a and an image sensor driver integrated circuit 410a. For convenience of illustration, the display panel 360 and the pixel array 460 in FIG. 10 are omitted.

The host processor 202a may include a first thermal sensor 210, a main processor 222, a display controller 230, a display interface 240, a memory 252, an image signal processor 260 and an image sensor interface (IIF) 270. The display driver integrated circuit 310a may include a second thermal sensor 320, a display interface 330, a timing controller 340 and a row/column driver 350. The image sensor driver integrated circuit 410a may include a third thermal sensor 420, an image sensor interface 430, a timing controller 440 and a row/column driver 450.

An operation between the host processor 202a and the display driver integrated circuit 310a may be substantially the same as that described with reference to FIG. 2, and thus an operation between the host processor 202a and the image sensor driver integrated circuit 410a will be mainly described with reference to FIG. 11.

The third thermal sensor 420 may be the same as the third thermal sensor 420 in FIG. 10, and may generate the third temperature information TINF3. For example, the third thermal sensor 420 of FIG. 11 may have the same configuration as the third thermal sensor 420 of FIG. 10.

The timing controller 440 may generate control signals used to control the row/column driver 450. The row/column driver 450 may generate second frame data FDAT2 based on a plurality of analog pixel signals that are obtained from the pixel array 460. The second frame data FDAT2 may correspond to a frame image captured by the image sensor 400.

The image sensor interface 430 may transmit the second frame data FDAT2 and the third temperature information TINF3 to the host processor 202a.

The image sensor interface 270 may receive the second frame data FDAT2 and the third temperature information TINF3 from the image sensor driver integrated circuit 410a.

In some example embodiments, the image sensor interfaces 270 and 430 may be implemented based on one of various interface standards, e.g., based on MIPI.

The memory 252 may store a first look-up table LT1, a second look-up table LT2 and a third look-up table LT3 that are used to generate the first performance control signal PCONT1.

The image signal processor 260 may generate and output second image data IDAT2 based on the second frame data FDAT2.

The main processor 222 may perform an image processing operation on the second image data IDAT2. The main processor 222 may receive the first temperature information TINF1, the second temperature information TINF2 and the third temperature information TINF3, and may generate a first control signal DCONT used to generate the first performance control signal PCONT1 based on the first temperature information TINF1, the second temperature information TINF2 and the third temperature information TINF3.

In some example embodiments, the host processor 202a may set the first performance control signal PCONT1 such that the boosting operation is performed for increasing the performance of the display driver integrated circuit 310a and the display panel 360 or the throttling operation is performed for decreasing the performance of the display driver integrated circuit 310a and the display panel 360 based on the first performance control signal PCONT1.

For example, the main processor 222 may determine, based on the first temperature information TINF1 and the first look-up table LT1, a first duration that is allowed to maintain a first performance when the display driver integrated circuit 310a and the display panel 360 are set to operate with the first performance. The main processor 222 may determine, based on the second temperature information TINF2 and the second look-up table LT2, a second duration that is allowed to maintain the first performance when the display driver integrated circuit 310a and the display panel 360 are set to operate with the first performance. The main processor 222 may determine, based on the third temperature information TINF3 and the third look-up table LT3, a third duration that is allowed to maintain the first performance when the display driver integrated circuit 310a and the display panel 360 are set to operate with the first performance. The main processor 222 may generate the first control signal DCONT used to set the first performance control signal PCONT1 based on the first duration, the second duration and the third duration. The display controller 230 may set the first performance control signal PCONT1 based on the first control signal DCONT.

For example, the main processor 222 may select one of the first duration, the second duration and the third duration, and the first performance control signal PCONT1 may be set based on the selected duration such that the display driver integrated circuit 310a and the display panel 360 operate with the first performance for the selected duration. For example, a relatively short duration may be selected from among the first duration, the second duration and the third duration.

In the display system according to example embodiments, the performance of the display device may be controlled based on not only the first temperature information TINF1 that is obtained from the first thermal sensor 210 inside the host processor 202a but also the second and third temperature information TINF2 and TINF3 that are obtained from the second and third thermal sensors 320 and 420 outside the host processor 202a. Accordingly, the performance of the display system may be adaptively and/or efficiently controlled, and may be instantaneously (or momentarily) maximized by the feedforward operation.

Figure 12:
FIG. 12 is a diagram for describing an operation of a display system of FIG. 11.

FIG. 12 is a diagram for describing an operation of a display system of FIG. 11. The descriptions repeated with FIGS. 3A and 3B will be omitted.

Referring to FIG. 12, an example of the third look-up table LT3 that is stored in the memory 252 included in the host processor 202a of FIG. 11 is illustrated.

The third look-up table LT3 may include a plurality of entries, each entry representing a relationship of the third temperature information TINF3 that is obtained from the third thermal sensor 420, the performance of the display device 300 and the duration that is allowed to maintain the specific performance.

For example, the third look-up table LT3 may include durations DUR_3_1_1, DUR_3_1_2 ..., DUR_3_1_M that are allowed to maintain the performances PERF_D_1, PERF_D_2, ..., PERF_D_M, respectively, by the display device 300 when the third temperature information TINF3 corresponds to a value TEMP_C_1. The third look-up table LT3 may include durations DUR_3_2_1, DUR_3_2_2, ..., DUR_3_2_M that are allowed to maintain the performances PERF_D_1, PERF_D_2, ..., PERF_D_M, respectively, by the display device 300 when the third temperature information TINF3 corresponds to a value TEMP_C_2. The third look-up table LT3 may include durations DUR_3_K_1, DUR_3_K_2, ..., DUR_3_K_M that are allowed to maintain the performances PERF_D_1, PERF_D_2, ..., PERF_D_M, respectively, by the display device 300 when the third temperature information TINF3 corresponds to a value TEMP_C_K.

In some example embodiments, the first performance control signal PCONT1 may be set such that the display device 300 operates with a desired performance, for example, the performance PERF_D_1. For example, when the first temperature information TINF1, the second temperature information TINF2 and the third temperature information TINF3 correspond to the values TEMP_H_1, TEMP_D_2 and TEMP_C_K, respectively, the duration DUR_1_1_1, the duration DUR_2_2_1 and the duration DUR_3_K_1 may be obtained based on the first look-up table LT1, the second look-up table LT2 and the third look-up table LT3. After that, the shortest duration, for example, the duration DUR_1_1_1 may be selected from among the obtained durations DUR_1_1_1, DUR_2_2_1 and DUR_3_K_1. Finally, the first performance control signal PCONT1 may be set such that the display device 300 operates with the desired performance PERF_D_1 for the selected duration DUR_1_1_1.

Figure 13:
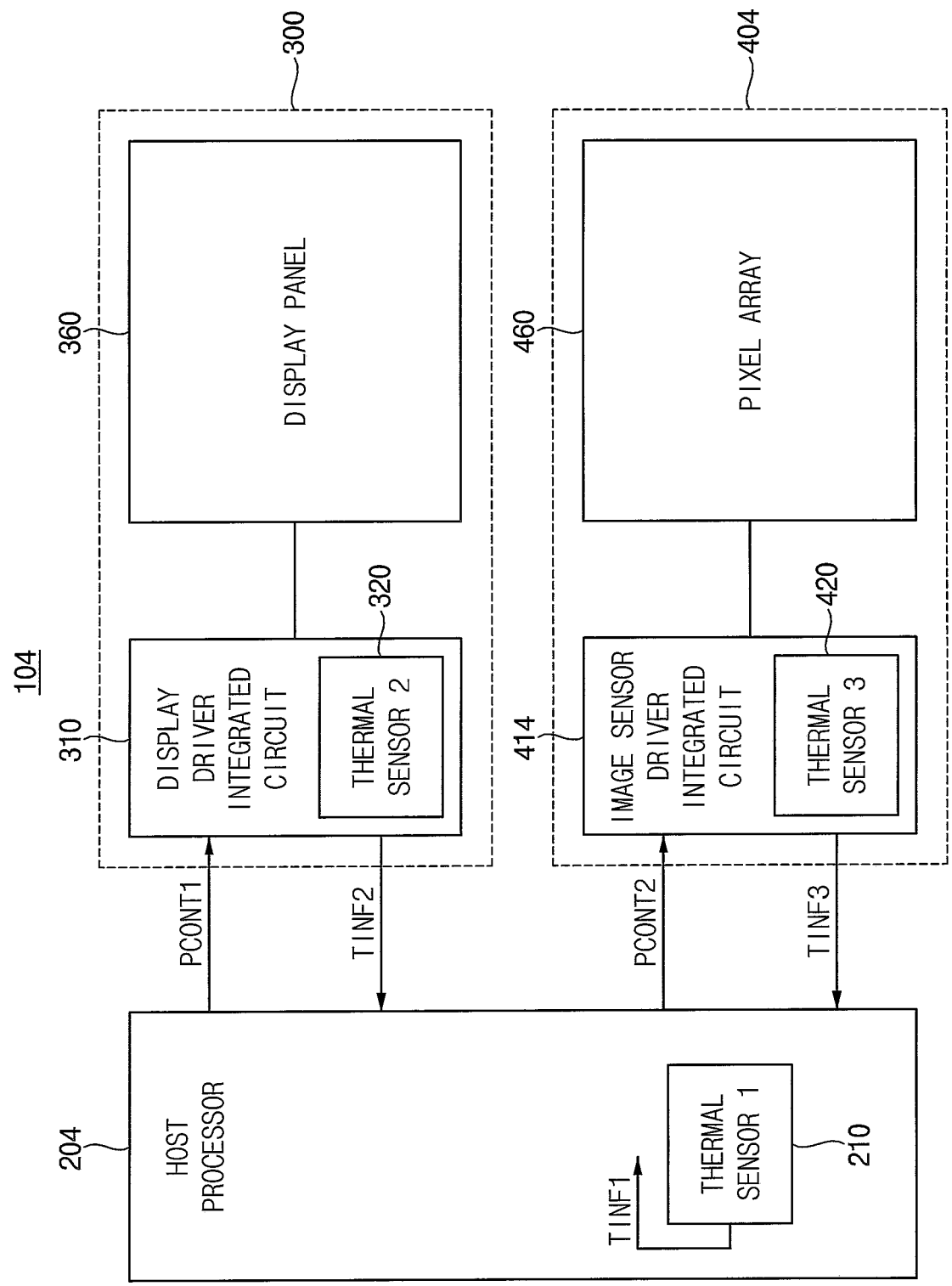
FIG. 13 is a block diagram illustrating a display system according to example embodiments.

FIG. 13 is a block diagram illustrating a display system according to example embodiments. The descriptions repeated with FIGS. 1 and 10 will be omitted.

Referring to FIG. 13, a display system 104 includes a host processor 204, a display device 300 and an image sensor 404. The image sensor 404 includes an image sensor driver integrated circuit 414 and a pixel array 460.

The display system 104 may be substantially the same as the display system 102 of FIG. 10, except that operations of the host processor 204 and the image sensor driver integrated circuit 414 are partially changed.

The host processor 204 further generates a second performance control signal PCONT2 based on the first temperature information TINF1 that is internally obtained from the first thermal sensor 210, the second temperature information TINF2 that is externally obtained from the second thermal sensor 320 and the third temperature information TINF3 that is externally obtained from the third thermal sensor 420, and further outputs the second performance control signal PCONT2. The second performance control signal PCONT2 is used to increase or decrease performance of the image sensor 404. The image sensor driver integrated circuit 414 may receive the second performance control signal PCONT2 from the host processor 204, and may control the image sensor 404 based on the second performance control signal PCONT2 such that the performance of the image sensor 404 increases or decreases.

Detailed configurations and operations of the host processor 204, the display driver integrated circuit 310 and the image sensor driver integrated circuit 414 will be described with reference to FIGS. 14, 15A, 15B and 15C.

In some example embodiments, the host processor 204 may set the second performance control signal PCONT2 based on the first temperature information TINF1, the second temperature information TINF2 and the third temperature information TINF3 such that a boosting operation is performed for increasing the performance of the image sensor 404 based on the second performance control signal PCONT2. In other example embodiments, the host processor 204 may set the second performance control signal PCONT2 based on the first temperature information TINF1, the second temperature information TINF2 and the third temperature information TINF3 such that a throttling operation is performed for decreasing the performance of the image sensor 404 based on the second performance control signal PCONT2.

In some example embodiments, the performance of the image sensor 404 may include a frame rate of the image sensor 404. The frame rate may correspond to the number of frame images captured by the image sensor 404 during a unit interval. However, the performance of the image sensor 404 is not limited thereto.

Figure 14:
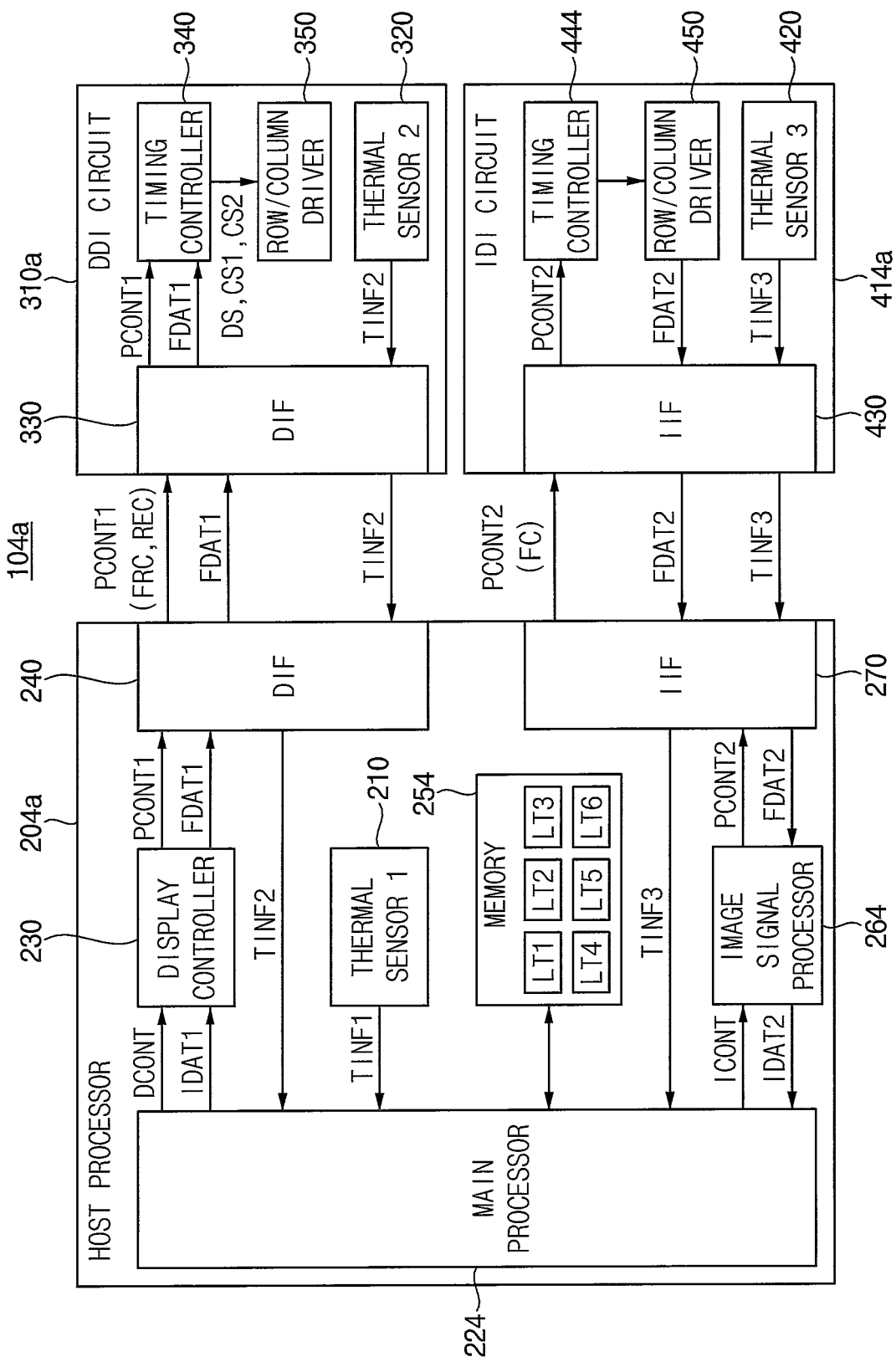
FIG. 14 is a block diagram illustrating an example of a display system of FIG. 13.

FIG. 14 is a block diagram illustrating an example of a display system of FIG. 13. The descriptions repeated with FIGS. 2 and 11 will be omitted.

Referring to FIG. 14, a display system 104a includes a host processor 204a, a display driver integrated circuit 310a and an image sensor driver integrated circuit 414a. For convenience of illustration, the display panel 360 and the pixel array 460 in FIG. 13 are omitted.

The host processor 204a may include a first thermal sensor 210, a main processor 224, a display controller 230, a display interface 240, a memory 254, an image signal processor 264 and an image sensor interface 270. The display driver integrated circuit 310a may include a second thermal sensor 320, a display interface 330, a timing controller 340 and a row/column driver 350. The image sensor driver integrated circuit 414a may include a third thermal sensor 420, an image sensor interface 430, a timing controller 444 and a row/column driver 450.

An operation between the host processor 204a and the display driver integrated circuit 310a and an operation of generating, transmitting and processing the second frame data FDAT2 and the third temperature information TINF3 between the host processor 204a and the image sensor driver integrated circuit 414a may be substantially the same as those described with reference to FIGS. 2 and 11, and thus an operation of generating, transmitting and processing the second performance control signal PCONT2 between the host processor 204a and the image sensor driver integrated circuit 414a will be mainly described with reference to FIG. 14.

The main processor 224 may generate a second control signal ICONT used to generate the second performance control signal PCONT2 based on the first temperature information TINF1, the second temperature information TINF2 and the third temperature information TINF3.

The memory 254 may store a fourth look-up table LT4, a fifth look-up table LT5 and a sixth look-up table LT6 that are used to generate the second performance control signal PCONT2.

The image signal processor 264 may generate and output the second performance control signal PCONT2 based on the second control signal ICONT. The second performance control signal PCONT2 may be used to increase or decrease the performance of the image sensor 404.

The image sensor interface 270 may transmit the second performance control signal PCONT2 to the image sensor driver integrated circuit 414a.

The image sensor interface 430 may receive the second performance control signal PCONT2 from the host processor 204a.

The timing controller 444 may generate control signals used to control the row/column driver 450 based on the second performance control signal PCONT2.

In some example embodiments, the host processor 204a may set the second performance control signal PCONT2 such that the boosting operation is performed for increasing the performance of the image sensor driver integrated circuit 414a and the pixel array 460 or the throttling operation is performed for decreasing the performance of the image sensor driver integrated circuit 414a and the pixel array 460 based on the second performance control signal PCONT2.

An operation of setting the second performance control signal PCONT2 may be similar to the operation of setting the first performance control signal PCONT1. For example, durations that are allowed to maintain a desired performance when the image sensor driver integrated circuit 414a and the pixel array 460 are set to operate with the desired performance may be determine based on the temperature information TINF1, TINF2 and TINF3 and the look-up tables LT4, LT5 and LT6, one of the determined durations may be selected, the second control signal ICONT may be generated based on the selected duration, and the second performance control signal PCONT2 may be set based on the second control signal ICONT. An operation of selecting one duration may also be similar to that described with reference to FIGS. 2, 3A, 3B, 11 and 12.

In some example embodiments, the second performance control signal PCONT2 may include a frame rate control signal FC used to adjust the frame rate of the image sensor 404.

Figure 15A:
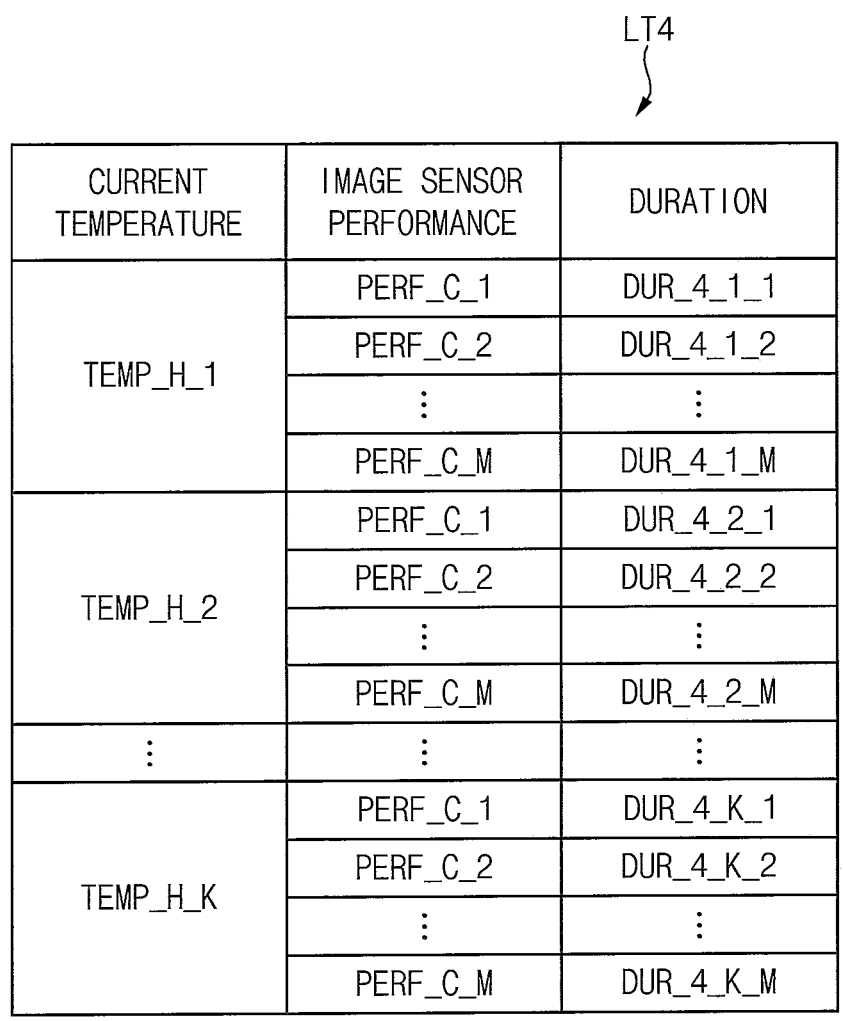
Figure 15B:
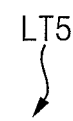

FIGS. 15A, 15B and 15C are diagrams for describing an operation of a display system of FIG. 14. The descriptions repeated with FIGS. 3A, 3B and 12 will be omitted.

Referring to FIGS. 15A, 15B and 15C, an example of the fourth look-up table LT4, the fifth look-up table LT5 and the sixth look-up table LT6 that are stored in the memory 254 included in the host processor 204a of FIG. 14 is illustrated.

For example, as illustrated in FIG. 15A, the fourth look-up table LT4 may include or represent a relationship of the first temperature information TINF1 (e.g., the values TEMP_H_1, TEMP_H_2, . . . , TEMP_H_K) that is obtained from the first thermal sensor 210, performances PERF_C_1, PERF_C_2, . . . , PERF_C_M of the image sensor 404, and durations DUR_4_1_1, DUR_4_1_2, . . . , DUR_4_1_M, DUR_4_2_1, DUR_4_2_2, . . . , DUR_4_2_M, DUR_4_K_1, DUR_4_K_2, . . . , DUR_4_K_M that are allowed to maintain the performances PERF_C_1, PERF_C_2, . . . , PERF_C_M.

Similarly, as illustrated in FIG. 15B, the fifth look-up table LT5 may include or represent a relationship of the second temperature information TINF2 (e.g., the values TEMP_D_1, TEMP_D_2, . . . , TEMP_D_K) that is obtained from the second thermal sensor 320, the performances PERF_C_1, PERF_C_2, . . . , PERF_C_M of the image sensor 404, and durations DUR_5_1_1, DUR_5_1_2, . . . , DUR_5_1_M, DUR_5_2_1, DUR_5_2_2, . . . , DUR_5_2_M, DUR_5_K_1, DUR_5_K_2, . . . , DUR_5_K_M that are allowed to maintain the performances PERF_C_1, PERF_C_2, . . . , PERF_C_M.

In addition, as illustrated in FIG. 15C, the sixth look-up table LT6 may include or represent a relationship of the third temperature information TINF3 (e.g., the values TEMP_C_1, TEMP_C_2, . . . , TEMP_C_K) that is obtained from the third thermal sensor 420, the performances PERF_C_1, PERF_C_2, . . . , PERF_C_M of the image sensor 404, and durations DUR_6_1_1, DUR_6_1_2, . . . , DUR_6_1_M, DUR_6_2_1, DUR_6_2_2, . . . , DUR_6_2_M, DUR_6_K_1, DUR_6_K_2, . . . , DUR_6_K_M that are allowed to maintain the performances PERF_C_1, PERF_C_2, . . . , PERF_C_M.

The second performance control signal PCONT2 may be set based on the fourth look-up table LT4, the fifth look-up table LT5 and the sixth look-up table LT6 such that the image sensor 404 operates with a desired performance.

In some example embodiments, although not illustrated in detail, the first thermal sensor in each of the display systems 102a and 104a of FIGS. 11 and 14 may receive the second and third temperature information TINF2 and TINF3, as illustrated in FIG. 6. In some example embodiments, although not illustrated in detail, each of the display systems 102a and 104a of FIGS. 11 and 14 may further include temperature information interfaces, as illustrated in FIG. 7.

Figure 16:
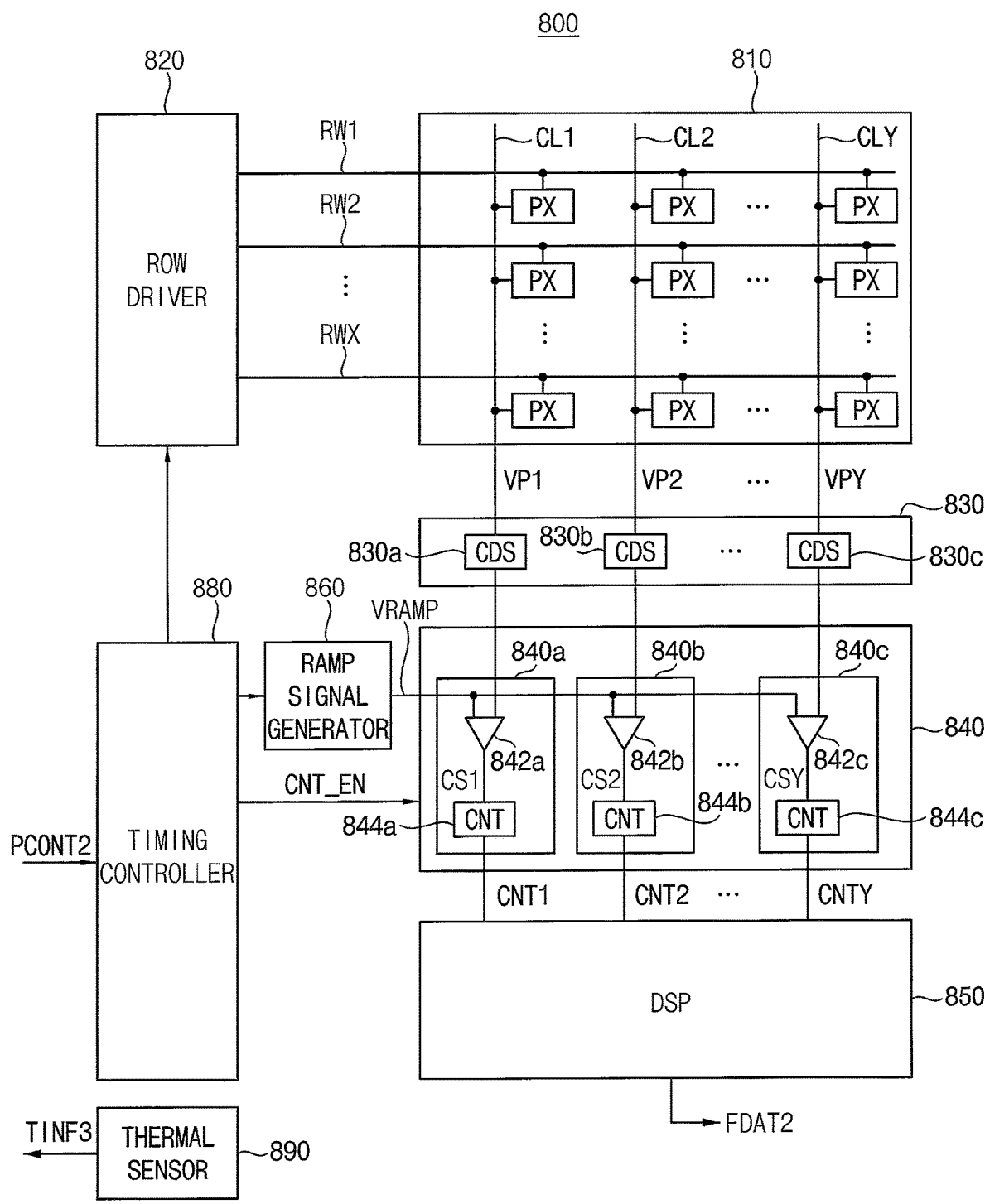
FIG. 16 is a block diagram illustrating an example of an image sensor included in a display system according to example embodiments.

FIG. 16 is a block diagram illustrating an example of an image sensor included in a display system according to example embodiments.

Referring to FIG. 16, an image sensor 800 includes a pixel array 810 and an image sensor driver integrated circuit. The image sensor driver integrated circuit may include a row driver 820, a correlated double sampling (CDS) block 830, an analog-to-digital converting (ADC) block 840, a digital signal processor (DSP) 850, a ramp signal generator 860, a timing controller 880 and a thermal sensor 890.

The pixel array 810 may include a plurality of pixels (or unit pixels) PX that are arranged in a matrix formation. Each of the plurality of pixels PX may be connected to a respective one of a plurality of rows RW1, RW2, . . . , RWX and a respective one of a plurality of columns CL1, CL2, . . . , CLY, where each of X and Y is a natural number greater than or equal to two. The pixel array 810 may generate a plurality of analog pixel signals VP1, VP2, . . . , VPY based on incident light. An example of each of the plurality of pixels PX will be described with reference to FIG. 17.

The row driver 820 may be connected to the plurality of rows RW1 through RWX of the pixel array 810. The row driver 820 may generate driving signals to drive the plurality of rows RW1 through RWX. For example, the row driver 820 may drive the plurality of pixels PX included in the pixel array 810 row by row.

The correlated double sampling block 830 may include a plurality of correlated double sampling circuits (CDSs) 830a, 830b, . . . , 830c. The plurality of correlated double sampling circuits 830a through 830c may be connected to the plurality of columns CL1 through CLY of the pixel array 810. The plurality of correlated double sampling circuits 830a through 830c may perform a correlated double sampling operation on the plurality of analog pixel signals VP1 through VPY output from the pixel array 810.

The analog-to-digital converting block 840 may include a plurality of analog-to-digital converters 840a, 840b, . . . , 840c. The plurality of analog-to-digital converters 840a through 840c may be connected to the plurality of columns CL1 through CLY of the pixel array 810 via the plurality of correlated double sampling circuits 830a through 830c. The plurality of analog-to-digital converters 840a through 840c may perform a column analog-to-digital converting operation that converts the plurality of analog pixel signals VP1 through VPY (e.g., a plurality of correlated double sampled analog pixel signals output from the plurality of correlated double sampling circuits 830a through 830c) into a plurality of digital signals CNT1, CNT2, CNTY in parallel (e.g., simultaneously or concurrently).

Each of the plurality of analog-to-digital converters 840a through 840c may include a respective one of a plurality of comparators 842a, 842b, . . . , 842c and a respective one of a plurality of counters (CNTs) 844a, 844b, . . . , 844c. For example, the first analog-to-digital converter 840a may include the first comparator 842a and the first counter 844a. The first comparator 842a may compare the first analog pixel signal VP1 (e.g., the correlated double sampled first analog pixel signal output from the first correlated double sampling circuit 830a) with a ramp signal VRAMP to generate a first comparison signal CS1. The first counter 844a may count a level transition timing of the first comparison signal CS1 to generate the first digital signal CNT1.

Operations of the correlated double sampling block 830 and the analog-to-digital converting block 840 may be performed on the plurality of pixels PX included in the pixel array 810 row by row.

The plurality of correlated double sampling circuits 830a through 830c and the plurality of analog-to-digital converters 840a through 840c may form a plurality of column driving circuits. For example, the first correlated double sampling circuit 830a and the first analog-to-digital converter 840a may form a first column driving circuit.

The digital signal processor 850 may perform a digital signal processing operation based on the plurality of digital signals CNT1 through CNTY. The digital signal processor 850 may output the second frame data FDAT2 that is generated by the digital signal processing operation.

The ramp signal generator 860 may generate the ramp signal VRAMP. The timing controller 880 may control overall operation timings of the image sensor 800, and may generate control signals including a count enable signal CNT EN, a clock signal (not illustrated), etc.

The thermal sensor 890 may generate the third temperature information TINF3 that represents a current temperature and/or an operating temperature inside the image sensor driver integrated circuit.

The thermal sensor 890 may correspond to the third thermal sensor 420 in FIGS. 11 and 14, the timing controller 880 may correspond to the timing controllers 440 and 444 in FIGS. 11 and 14, and the row driver 820, the correlated double sampling block 830 and the analog-to-digital converting block 840 may correspond to the row/column driver 450 in FIGS. 11 and 14.

Figure 17:
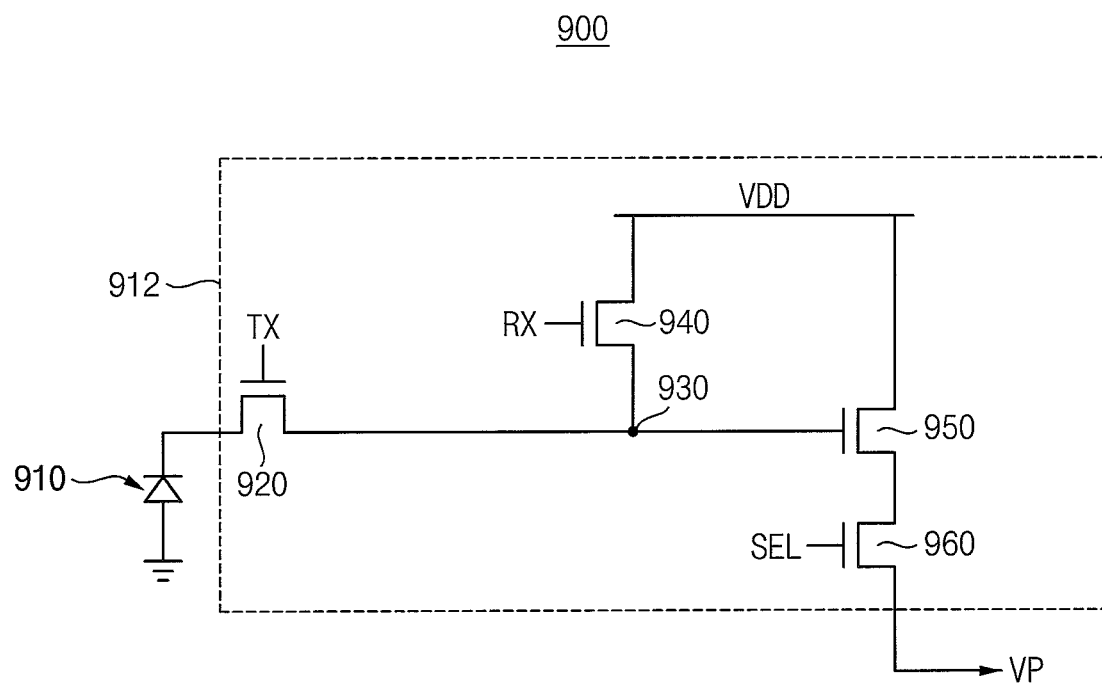
FIG. 17 is a circuit diagram illustrating an example of a pixel included in a pixel array included in an image sensor of FIG. 16.

FIG. 17 is a circuit diagram illustrating an example of a pixel included in a pixel array included in an image sensor of FIG. 16.

Referring to FIG. 17, a pixel (or unit pixel) 900 may include a photoelectric conversion unit 910 and a signal generation unit 912.

The photoelectric conversion unit 910 may perform a photoelectric conversion operation. For example, the photoelectric conversion unit 910 may convert the incident light into photo-charges during an integration mode. If an image sensor including the pixel 900 is a complementary metal oxide semiconductor (CMOS) image sensor, image information on an object to be captured may be obtained by collecting charge carriers (e.g., electron-hole pairs) in the photoelectric conversion unit 910 proportional to intensity of the incident light through an open shutter of the CMOS image sensor during the integration mode.

The signal generation unit 912 may generate an electric signal (e.g., an analog pixel signal VP) based on the photo-charges generated by the photoelectric conversion operation during a readout mode. If the image sensor including the pixel 900 is the CMOS image sensor, the shutter may be closed, and the analog pixel signal VP may be generated based on the image information in a form of the charge carriers during the readout mode after the integration mode. For example, as illustrated in FIG. 17, the pixel 900 may have four-transistor structure including four transistors.

For example, the signal generation unit 912 may include a transfer transistor 920, a reset transistor 940, a driving transistor 950, a selection transistor 960 and a floating diffusion node 930. The transfer transistor 920 may be disposed between the photoelectric conversion unit 910 and the floating diffusion node 930, and may include a gate electrode receiving a transfer signal TX. For example, the transfer transistor 920 may selectively electrically connect the photoelectric conversion unit 910 to the floating diffusion node 930 in response to the transfer signal TX. The reset transistor 940 may be disposed between a power supply voltage VDD and the floating diffusion node 930, and may include a gate electrode receiving a reset signal RX. For example, the reset transistor 940 may selectively electrically connect the power supply voltage VDD to the floating diffusion node 930 in response to the reset signal RX. The driving transistor 950 may be disposed between the power supply voltage VDD and the selection transistor 960, and may include a gate electrode connected to the floating diffusion node 930. For example, the driving transistor 950 may selectively electrically connect the power supply voltage VDD to the selection transistor 960 in response to a voltage of the floating diffusion node 930. The selection transistor 960 may be disposed between the driving transistor 950 and an output terminal outputting the analog pixel signal VP, and may include a gate electrode receiving a selection signal SEL. For example, the selection transistor 960 may selectively electrically connect the driving transistor 960 to the output terminal to output the analog pixel signal VP in response to the selection signal SEL.

In some example embodiments, one signal generation unit may be shared by a plurality of photoelectric conversion units.

Figure 18:
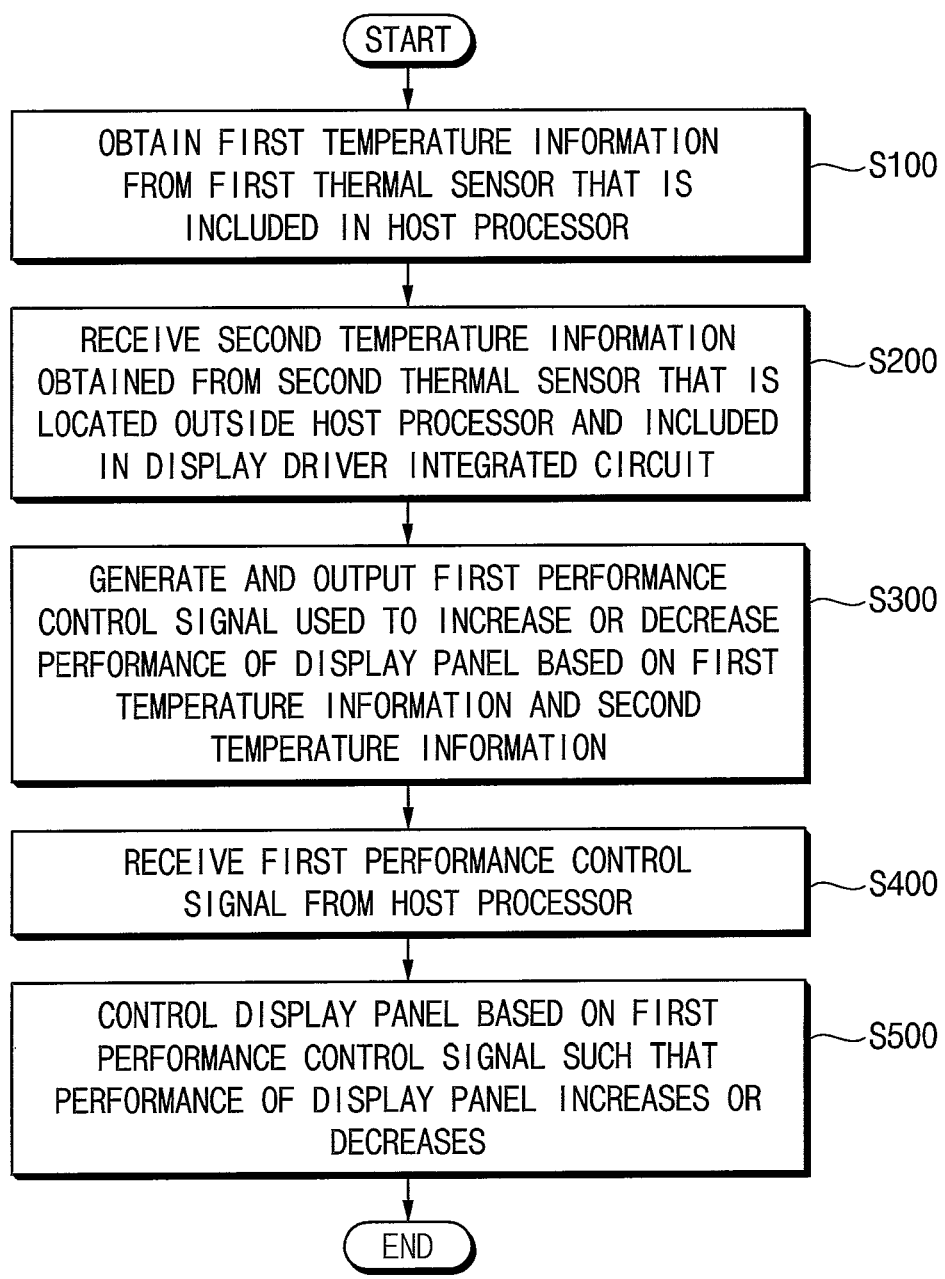
FIG. 18 is a flowchart illustrating a method of operating a display system according to example embodiments.

FIG. 18 is a flowchart illustrating a method of operating a display system according to example embodiments.

Referring to FIGS. 1 and 18, in a method of operating a display system according to example embodiments, the host processor 200 obtains the first temperature information TINF1 from the first thermal sensor 210 that is included in the host processor 200 (step S100). The host processor 200 receives the second temperature information TINF2 from the display driver integrated circuit 310 (step S200). The second temperature information TINF2 is obtained from the second thermal sensor 320 that is located outside the host processor 200 and is included in the display driver integrated circuit 310. For example, steps S100 and S200 may be performed as described with reference to FIGS. 2, 6 and 7.

The host processor 200 generates and outputs the first performance control signal PCONT1 used to increase or decrease the performance of the display panel 360 based on the first temperature information TINF1 and the second temperature information TINF2 (step S300). Step S300 will be described with reference to FIGS. 19 and 20.

The display driver integrated circuit 310 receives the first performance control signal PCONT1 from the host processor 200 (step S400). The display driver integrated circuit 310 controls the display panel 360 based on the first performance control signal PCONT1 such that the performance of the display panel 360 increases or decreases (step S500). For example, steps S400 and S500 may be performed as described with reference to FIGS. 4A, 4B, 5A and 5B.

Figure 19:
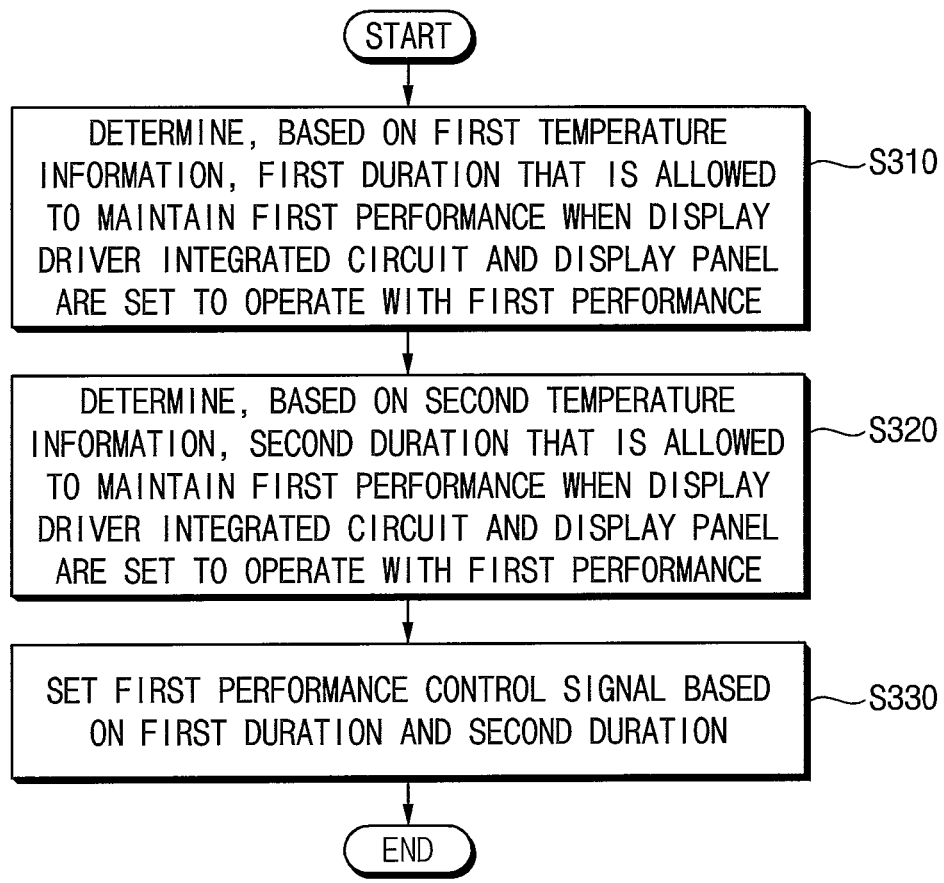
FIG. 19 is a flowchart illustrating an example of generating and outputting a first performance control signal in FIG. 18.

FIG. 19 is a flowchart illustrating an example of generating and outputting a first performance control signal in FIG. 18.

Referring to FIGS. 1, 2, 18 and 19, when generating and outputting the first performance control signal PCONT1 (step S300), the first duration that is allowed to maintain the first performance when the display driver integrated circuit 310a and the display panel 360 are set to operate with the first performance may be determined based on the first temperature information TINF1 and the first look-up table LT1 (step S310). The second duration that is allowed to maintain the first performance when the display driver integrated circuit 310a and the display panel 360 are set to operate with the first performance may be determined based on the second temperature information TINF2 and the second look-up table LT2 (step S320). The first performance control signal PCONT1 may be set based on the first duration and the second duration (step S330).

Figure 20:
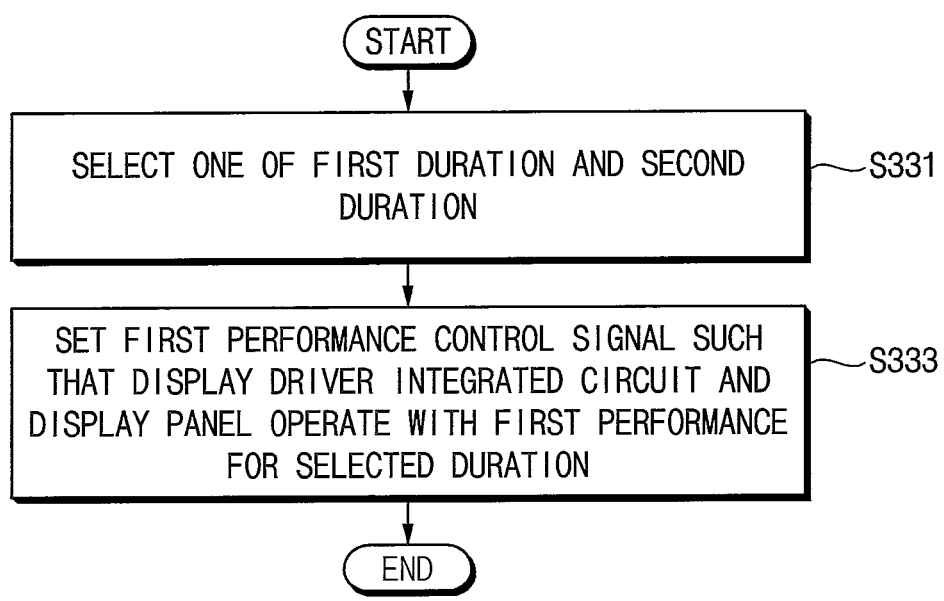
FIG. 20 is a flowchart illustrating an example of setting a first performance control signal in FIG. 19.

FIG. 20 is a flowchart illustrating an example of setting a first performance control signal in FIG. 19.

Referring to FIGS. 1, 2, 19 and 20, when setting the first performance control signal PCONT1 (step S330), one of the first duration and the second duration may be selected (step S331). The first performance control signal PCONT1 may be set such that the display driver integrated circuit 310a and the display panel 360 operate with the first performance for the selected duration (step S333).

Steps S310, S320 and S330 in FIG. 19 and steps S331 and S333 in FIG. 20 may be performed as described with reference to FIGS. 2 and 3.

Figure 21:
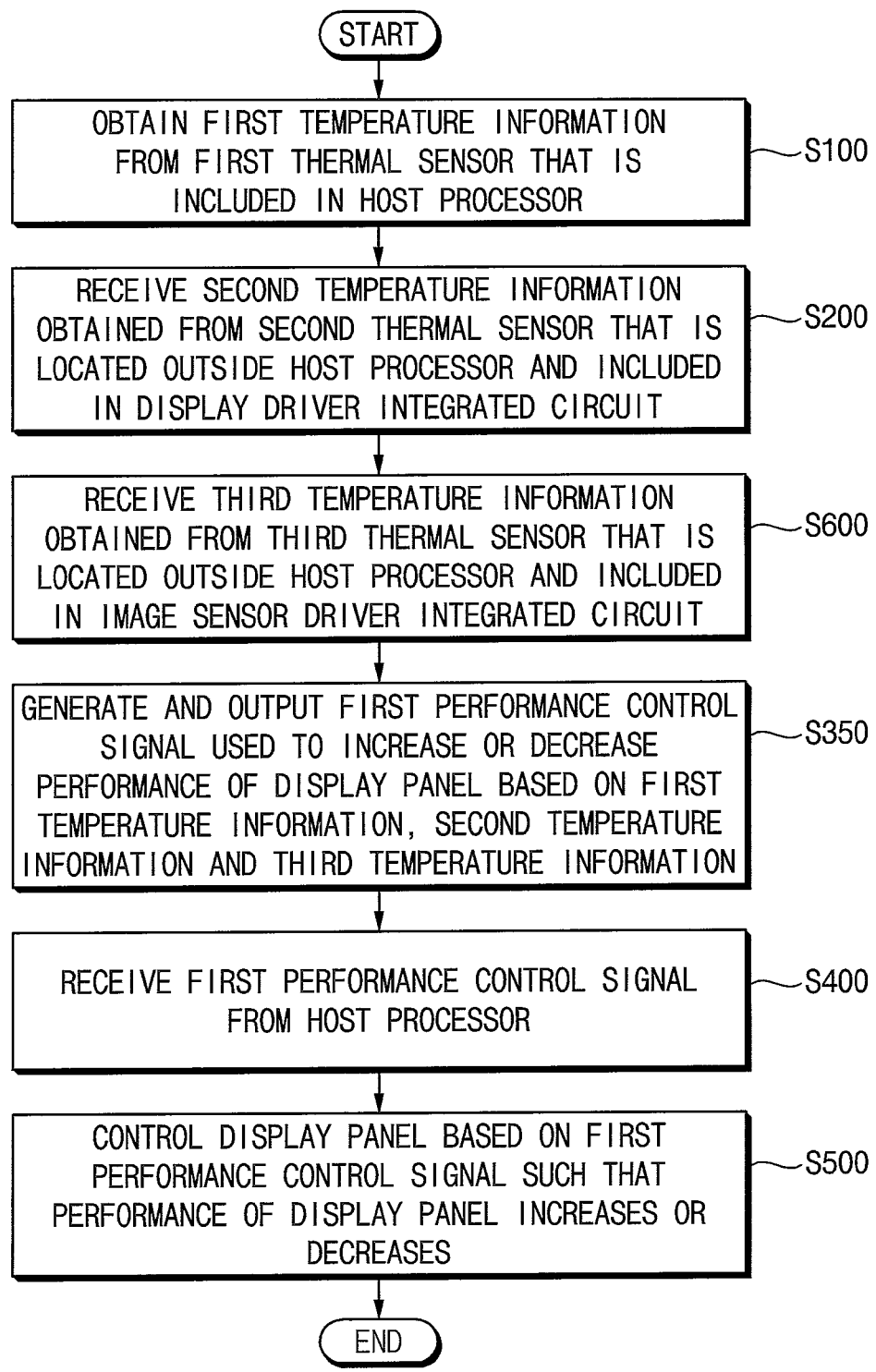
FIGS. 21 and 22 are flowcharts illustrating a method of operating a display system according to example embodiments.
Figure 22:
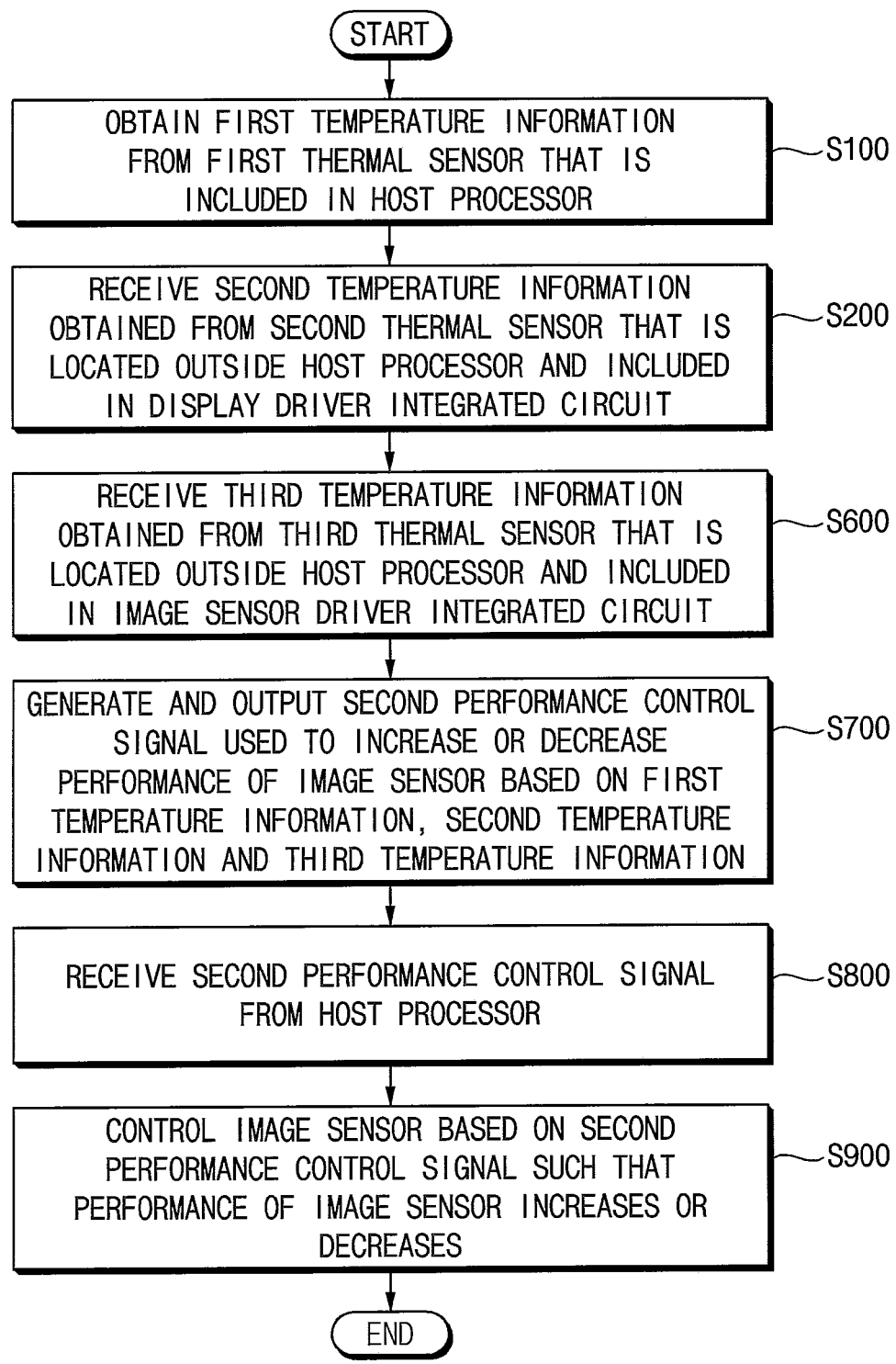

FIGS. 21 and 22 are flowcharts illustrating a method of operating a display system according to example embodiments. The descriptions repeated with FIG. 18 will be omitted.

Referring to FIGS. 10 and 21, in a method of operating a display system according to example embodiments, steps S100, S200, S400 and S500 may be substantially the same as steps S100, S200, S400 and S500 in FIG. 18, respectively.

The host processor 202 receives the third temperature information TINF3 from the image sensor driver integrated circuit 410 (step S600). The third temperature information TINF3 is obtained from the third thermal sensor 420 that is located outside the host processor 202 and is included in the image sensor driver integrated circuit 410. The host processor 202 generates and outputs the first performance control signal PCONT1 used to increase or decrease the performance of the display panel 360 based on the first temperature information TINF1, the second temperature information TINF2 and the third temperature information TINF3 (step S350). For example, steps S600 and S350 may be performed as described with reference to FIGS. 11 and 12. Step S350 may be similar to step S300 in FIG. 18.

Referring to FIGS. 13 and 22, in a method of operating a display system according to example embodiments, steps S100, S200 and S600 may be substantially the same as steps S100, S200 and S600 in FIG. 21, respectively.

The host processor 204 generates and outputs the second performance control signal PCONT2 used to increase or decrease the performance of the image sensor 404 based on the first temperature information TINF 1, the second temperature information TINF2 and the third temperature information TINF3 (step S700). The image sensor driver integrated circuit 414 receives the second performance control signal PCONT2 from the host processor 204 (step S800). The image sensor driver integrated circuit 414 controls the image sensor 404 based on the second performance control signal PCONT2 such that the performance of the image sensor 404 increases or decreases (step S900). For example, steps S700, S800 and S900 may be performed as described with reference to FIGS. 14 and 15. Steps S700, S800 and S900 may be similar to steps S350, S400 and S500 in FIG. 21, respectively.

In some example embodiments, steps S350, S400 and S500 in FIG. 21 and steps S700, S800 and S900 in FIG. 22 may be substantially simultaneously or concurrently performed.

Figure 23:
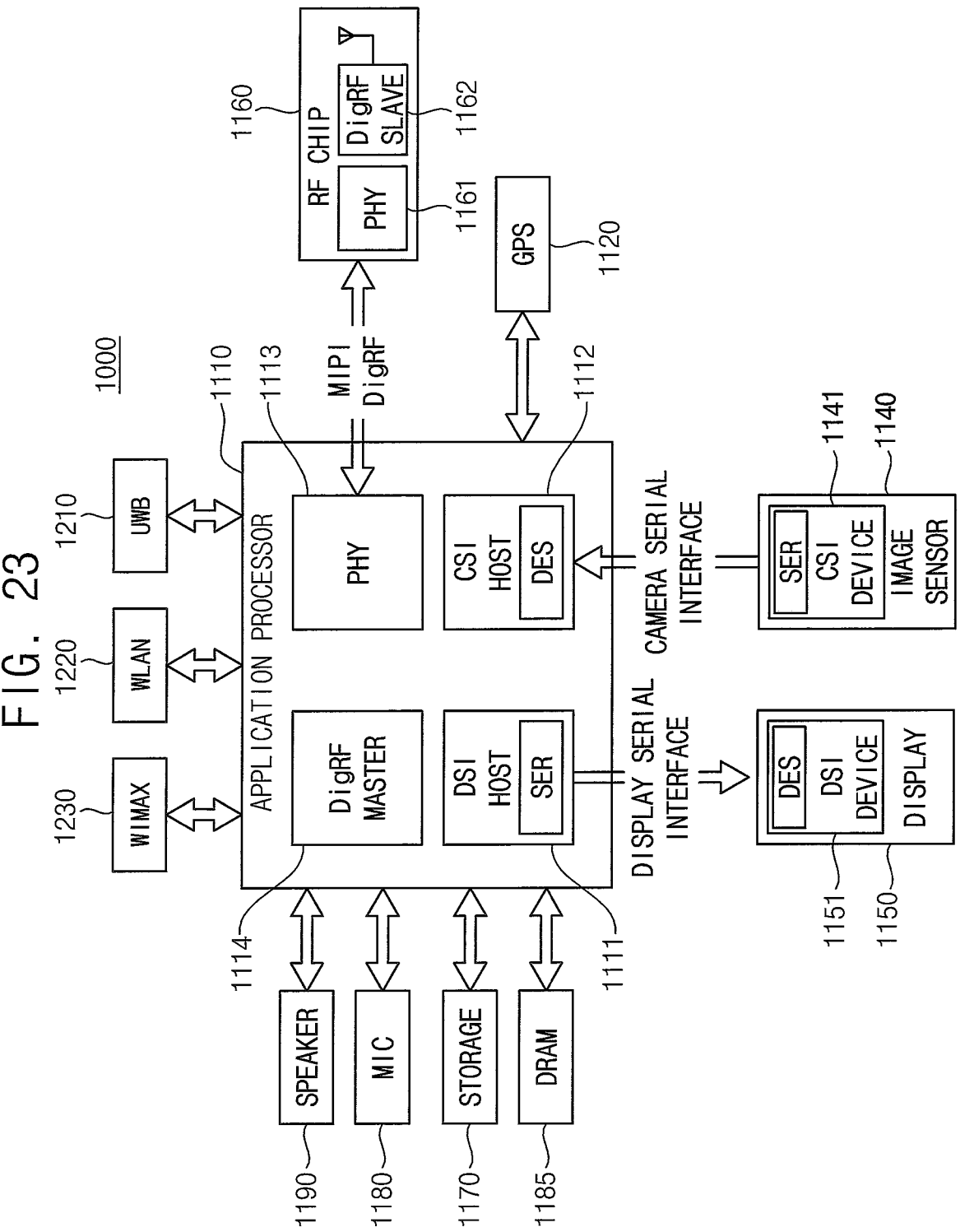
FIG. 23 is a block diagram illustrating an electronic system including a display system according to example embodiments.

FIG. 23 is a block diagram illustrating an electronic system including a display system according to example embodiments.

Referring to FIG. 23, an electronic system 1000 may be implemented as a data processing device that uses or supports a mobile industry processor interface (MIPI). The electronic system 1000 may include an application processor 1110, an image sensor 1140, a display device 1150, etc. The electronic system 1000 may further include a radio frequency (RF) chip 1160, a global positioning system (GPS) 1120, a storage 1170, a microphone (MIC) 1180, a dynamic random access memory (DRAM) 1185 and a speaker 1190. In addition, the electronic system 1000 may perform communications using an ultra wideband (UWB) 1210, a wireless local area network (WLAN) 1220, a worldwide interoperability for microwave access (WIMAX) 1230, etc.

The application processor 1110 may be a controller or a processor that controls operations of the image sensor 1140 and the display device 1150.

The application processor 1110 may include a display serial interface (DSI) host 1111 that performs a serial communication with a DSI device 1151 of the display device 1150, a camera serial interface (CSI) host 1112 that performs a serial communication with a CSI device 1141 of the image sensor 1140, a physical layer (PHY) 1113 that performs data communications with a PHY 1161 of the RF chip 1160 based on a MIPI DigRF, and a DigRF MASTER 1114 that controls the data communications of the physical layer 1161. A DigRF SLAVE 1162 of the RF chip 1160 may be controlled through the DigRF MASTER 1114.

In some example embodiments, the DSI host 1111 may include a serializer (SER), and the DSI device 1151 may include a deserializer (DES). In some example embodiments, the CSI host 1112 may include a deserializer (DES), and the CSI device 1141 may include a serializer (SER).

The application processor 1110, the DSI device 1151 and the CSI device 1141 may be the host processor, the display driver integrated circuit and the image sensor driver integrated circuit according to example embodiments, respectively. The application processor 1110, the DSI device 1151 and the CSI device 1141 may form the display system according to example embodiments, and may perform the method of operating the display system according to example embodiments.

The inventive concept may be applied to various electronic devices and systems that include the display devices and the display systems. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A display system comprising:
a host processor including a first thermal sensor, wherein a plurality of transistors of the host processor are integrated with the first thermal sensor at a same semiconductor substrate, and the first thermal sensor generates first temperature information; and
a display driver integrated circuit including a display interface and a second thermal sensor that is different from the first thermal sensor, wherein the second thermal sensor generates second temperature information and outputs the second temperature information via the display interface,
wherein the host processor is configured to:
receive the second temperature information from the display interface of the display driver integrated circuit; and
generate a first performance control signal indicating whether to increase or decrease performance of a display panel from first temperature information that is obtained from the first thermal sensor and the second temperature information that is obtained from the display driver integrated circuit, and to output the first performance control signal,
wherein the display driver integrated circuit is configured to receive the first performance control signal from the host processor, and to control the display panel based on the first performance control signal to adjust the performance of the display panel,
wherein the host processor is configured:
to determine, based on the first temperature information, a first duration for which the display driver integrated circuit and the display panel are set to operate with a first performance,
to determine, based on the second temperature information, a second duration for which the display driver integrated circuit and the display panel are set to operate the first performance,
to select the first duration when the first duration is shorter than the second duration, and
to set the first performance control signal based on the first duration such that the display driver integrated circuit and the display panel operate with the first performance for the first duration.

2. The display system of claim 1,
wherein the host processor is configured to set the first performance control signal based on the first temperature information and the second temperature information such that a boosting operation is performed to increase the performance of the display panel based on the first performance control signal.

3. The display system of claim 1,
wherein the host processor includes:
a first look-up table including a plurality of first entries, each of the plurality of first entries representing a relationship of the first temperature information, the first performance and the first duration; and
a second look-up table including a plurality of second entries, each of the plurality of second entries representing a relationship of the second temperature information, the first performance and second first duration.

4. The display system of claim 3,
wherein the host processor is configured to determine the first duration based on the first temperature information and the first look-up table, and the second duration based on the second temperature information and the second look-up table.

5. The display system of claim 1, wherein:
the first duration represents a time interval from a time point at which the display driver integrated circuit and the display panel start to operate with the first performance to a time point at which the first temperature information reaches a first value while the display driver integrated circuit and the display panel operate with the first performance, and
the second duration represents a time interval from the time point at which the display driver integrated circuit and the display panel start to operate with the first performance to a time point at which the second temperature information reaches the first value while the display driver integrated circuit and the display panel operate with the first performance.

6. The display system of claim 1,
wherein the host processor is configured to set the first performance control signal based on the first duration to perform a throttling operation in which the performance of the display panel is decreased.

7. The display system of claim 1,
wherein the first performance control signal includes at least one of a frame rate control signal and a resolution control signal,
wherein a frame rate of the display panel is adjusted with the frame rate control signal and a resolution of the display panel is adjusted with the resolution control signal.

8. The display system of claim 1, further comprising:
an image sensor driver integrated circuit including a third thermal sensor that is different from the first thermal sensor and the second thermal sensor, and
wherein the host processor is configured to generate the first performance control signal based on the first temperature information, the second temperature information and third temperature information, and
wherein the third temperature information is obtained from the third thermal sensor and is received from the image sensor driver integrated circuit.

9. The display system of claim 8, wherein:
the host processor is configured to generate a second performance control signal from the first temperature information, the second temperature information and the third temperature information, and to output the second performance control signal, and
the image sensor driver integrated circuit is configured to receive the second performance control signal from the host processor, and to control an image sensor based on the second performance control signal to adjust the performance of the image sensor.

10. The display system of claim 9, wherein
a main processor configured to generate a first control signal and a second control signal based on the first temperature information, the second temperature information and the third temperature information;
a display controller configured to generate the first performance control signal based on the first control signal; and
am image signal processor configured to generate the second performance control signal based on the second control signal.

11. A display system comprising:
a host processor including a first thermal sensor,
wherein a plurality of transistors of the host processor are integrated with the first thermal sensor at a same semiconductor substrate, and the first thermal sensor generates first temperature information; and
a display driver integrated circuit including a display interface and a second thermal sensor that is different from the first thermal sensor,
wherein the second thermal sensor generates second temperature information and outputs the second temperature information via the display interface,
wherein the display driver integrated circuit is configured to receive a first performance control signal from the host processor, and to control a display panel based on the first performance control signal to adjust the performance of the display panel, wherein the first thermal sensor is configured to receive the second temperature information, to select one of the first temperature information and the second temperature information, and to provide the selected one of the first temperature information and the second temperature information to the main processor, and
wherein the host processor further includes:
a main processor configured to generate a first control signal based on the selected one of the first temperature information and the second temperature information; and
a display controller configured to generate the first performance control signal based on the first control signal.

12. A method of operating a display system, the method comprising:
obtaining, by a host processor, first temperature information from a first thermal sensor that is integrated with a plurality of transistors of the host processor at a first semiconductor substrate;
receiving, by the host processor, second temperature information from a display driver integrated circuit, the second temperature information being obtained from a second thermal sensor that is different from the first thermal sensor, is located outside the host processor, and is integrated with a plurality of transistors of the display driver integrated circuit at a second semiconductor substrate;
generating, by the host processor, a first performance control signal indicating whether to increase or decrease performance of a display panel from the first temperature information and the second temperature information to output the first performance control signal;
receiving, by the display driver integrated circuit, the first performance control signal from the host processor; and
controlling, by the display driver integrated circuit, the display panel based on the first performance control signal to adjust the performance of the display panel,
wherein generating and outputting the first performance control signal includes:
determining, based on the first temperature information, a first duration for which the display driver integrated circuit and the display panel are set to operate with the first performance;
determining, based on the second temperature information, a second duration for which the display driver integrated circuit and the display panel are set to operate with the first performance; and
setting the first performance control signal based on the first duration and the second duration,
wherein setting the first performance control signal includes:
selecting the first duration when the first duration is shorter than the second duration; and
setting the first performance control signal such that the display driver integrated circuit and the display panel operate with the first performance for the first duration.

13. The method of claim 12, further comprising:
receiving, by the host processor, third temperature information from an image sensor driver integrated circuit, the third temperature information being obtained from a third thermal sensor that is different from the first thermal sensor and the second thermal sensor, is located outside the host processor, and is included in the image sensor driver integrated circuit, and wherein the first performance control signal is generated based on the first temperature information, the second temperature information and the third temperature information.

14. A display system comprising:

a host processor including a first thermal sensor configured to generate first temperature information, the host processor configured to generate a first performance control signal indicating whether to increase or decrease performance of a display panel from the first temperature information, second temperature information and third temperature information;

a display device controlled by the host processor, the display device including:

the display panel; and a display driver integrated circuit including a display interface and a second thermal sensor configured to generate the second temperature information, the display driver integrated circuit configured to control the display panel based on the first performance control signal to adjust the performance of the display panel, wherein the display interface outputs the second temperature information to the host processor; and an image sensor controlled by the host processor, the image sensor including:

a pixel array; and an image sensor driver integrated circuit including a third thermal sensor configured to generate the third temperature information, wherein the host processor is configured:

to determine, based on the first temperature information and a first look-up table, a first duration for which the display device maintains a first performance, to determine, based on the second temperature information and a second look-up table, a second duration for which the display device maintains the first performance, to determine, based on the third temperature information and a third look-up table, a third duration for which the display device maintains the first performance, to select a shortest one from among the first duration, the second duration and the third duration, and to set the first performance control signal based on the shortest one from among the first duration, the second duration and the third duration to operate the display device, and wherein a plurality of transistors of the host processor are integrated with the first thermal sensor at a same semiconductor substrate, and is configured to receive the second temperature information from the display interface of the display driver integrated circuit.

* * * * *